(12) United States Patent
Snyder, II et al.

(10) Patent No.: US 8,316,060 B1
(45) Date of Patent: Nov. 20, 2012

(54) SEGMENT MATCHING SEARCH SYSTEM AND METHOD

(75) Inventors: James Daniel Snyder, II, Cedar Park, TX (US); Craig Michael Chase, Austin, TX (US)

(73) Assignee: 21st Century Technologies, Austin, TX (US)

( * ) Notice: Subject to any disclaimer, the term of this patent is extended or adjusted under 35 U.S.C. 154(b) by 265 days.

(21) Appl. No.: 12/246,684

(22) Filed: Oct. 7, 2008

Related U.S. Application Data

(62) Division of application No. 11/590,070, filed on Oct. 30, 2006, and a division of application No. 11/340,046, filed on Jan. 26, 2006.

(60) Provisional application No. 60/731,431, filed on Oct. 28, 2005, provisional application No. 60/647,363, filed on Jan. 26, 2005.

(51) Int. Cl.
*G06F 7/00* (2006.01)
*G06F 17/30* (2006.01)

(52) U.S. Cl. ............... 707/797; 707/798; 707/809
(58) Field of Classification Search ............ 707/797, 707/798, 809, 999.102
See application file for complete search history.

(56) References Cited

U.S. PATENT DOCUMENTS

| | | | | |
|---|---|---|---|---|
| 5,469,367 A * | 11/1995 | Puri et al. | ............ | 716/18 |
| 5,963,942 A * | 10/1999 | Igata | ............ | 707/999.003 |
| 6,108,645 A * | 8/2000 | Eichstaedt et al. | ............ | 707/741 |
| 6,154,736 A * | 11/2000 | Chickering et al. | ............ | 706/59 |
| 6,529,891 B1 * | 3/2003 | Heckerman | ............ | 706/52 |
| 6,807,537 B1 * | 10/2004 | Thiesson et al. | ............ | 706/52 |
| 7,660,705 B1 * | 2/2010 | Meek et al. | ............ | 703/2 |
| 2004/0139070 A1 * | 7/2004 | Dysart et al. | ............ | 707/3 |
| 2004/0172347 A1 * | 9/2004 | Barthel | ............ | 705/31 |
| 2005/0096880 A1 * | 5/2005 | Morita et al. | ............ | 702/189 |

* cited by examiner

*Primary Examiner* — Phong Nguyen
(74) *Attorney, Agent, or Firm* — DLA Piper LLP (US)

(57) ABSTRACT

A planning and search system are described wherein a graph search and segment matching are used to handle very large searches at a higher speed.

4 Claims, 18 Drawing Sheets

Typed Graph Schemas

42

```
class A
    value name : String;
    relationship b : set(B);
end
class B
    value name : String;
    relationship c : set(C);
end
class C
    value name : String;
    relationship d : set(D);
end
class D
    value name : String;
    relationship a : set(A);
end
```

FIGURE 2

| A-B-C matches | A-B-C-D matches | A-B-C-D-A matches |
|---|---|---|
| 0, 10, 20 | 0, 10, 20, 30 | 0, 10, 20, 30, 0 |
| 0, 10, 21 | 0, 10, 21, 30 | 0, 10, 21, 30, 0 |
| 0, 11, 20 | 0, 10, 21, 31 | 0, 11, 20, 30, 0 |
| 0, 11, 21 | 0, 11, 20, 30 | 0, 11, 21, 30, 0 |
| 0, 11, 22 | 0, 11, 21, 30 | 0, 11, 22, 30, 0 |
| | 0, 11, 21, 31 | |
| | 0, 11, 22, 30 | |
| | 0, 11, 22, 31 | |

```
instance c1 : C where  ... end
optional instance d : D where ... end
connections
    a1.b connects b1;
    b1.c connects c1;
    c1.d connects d1;
    d1.a connects a1;
end
// constraint c1 is <boolean-expression> end
// value v1 : String is <expression> end
end
```

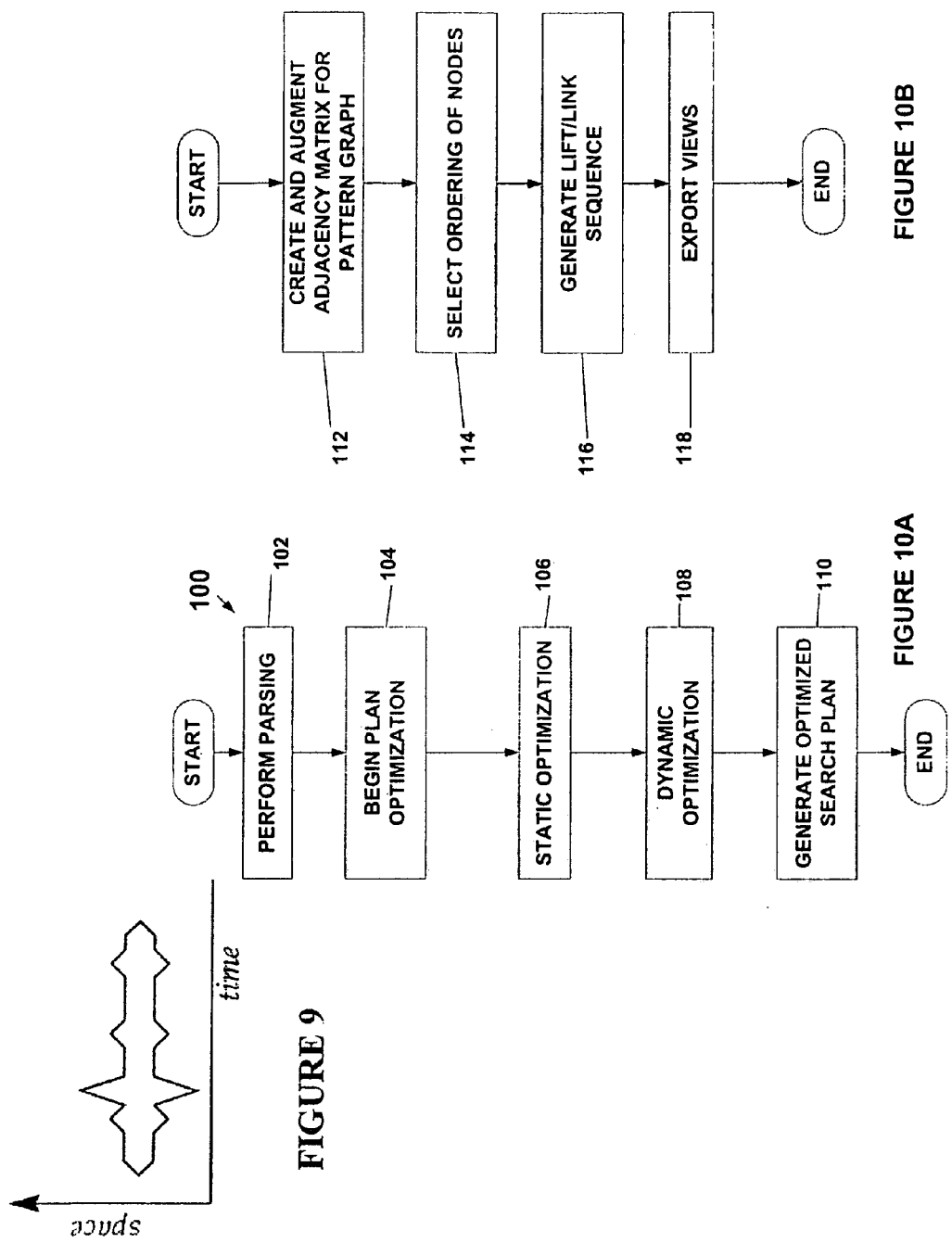

```
(sketch)
type Species is
    name : String
    length : Number
    weight : Number
    Connections
        memberOf : Family
        livedDuring : Period
        fossilsFound : Continent
    end
end
type Period is
    name : String
    beginDate : Number
    endDate : Number
end
type Family is
    name : String
    diet : String
end
type Continent is
    name : String
end
(database sketch)
```

FIGURE 19A

Table Continent

| Node ID | name |
|---|---|
| 0 | North America |
| 1 | Asia |
| 2 | South America |
| 3 | Africa |
| 4 | Europe |
| 5 | Australia |
| 6 | Antarctica |

Table Family

| Node ID | name | diet |
|---|---|---|
| 10 | Sauropod | herbivore |
| 11 | Tyrannosauroid | carnivore |
| 12 | Ceratopsid | herbivore |
| 13 | Hadrosaur | herbivore |

Table Period

| Node ID | name | beginDate | endDate |
|---|---|---|---|
| 20 | Triassic | 251 | 200 |
| 21 | Jurassic | 200 | 146 |
| 22 | Cretaceous | 146 | 65.5 |

Table Species

| Node ID | name | length | weight |
|---|---|---|---|
| 30 | Tyrannosaur | 45 | 7 |
| 31 | Parasaurolophus | 33 | 3.5 |
| 32 | Triceratops | 30 | 6 |
| 33 | Apatosaurus | 70 | 40 |
| 34 | Brachiosaurus | 100 | 60 |

FIGURE 19B

```
Pattern TriceratopsEnemy is
    instance cera : Species where name = Triceratops
    instance sharptooth : Species
    instance sharptooth_family : Family where diet = carnivore
    instance where : Continent
    instance when : Period
    connections
        cera to when via cera.livedDuring;
        sharptooth to when via sharptooth.livedDuring;
        cera to where via cera.fossilsFound;
        sharptooth to where via cera.fossilsFound;
        sharptooth to sharptooth_family via sharptooth.memberOf;
    end
End
```

FIGURE 20A 1. set table1 = loadCandidates(Species, where name = Triceratops)
2. set table2 = loadCandidates(Period, nil)
3. link (table1, table2, livedDuring)
4. set table3 = loadCandidates(Species, nil)
5. link_reversed(table2, table3, livedDuring)
6. set table4 = loadCandidates(Family, where diet = Herbivore)
7. link (table3, table4, memberOf)
8. garbageCollect()
9. lift(table3, nil)
10. set table5 = loadCandidates(Continent)
11. link (table3, table5, fossilsFound)
12. lift(table3, fossilsFound)

FIGURE 20B

SEGMENT MATCHING SEARCH SYSTEM AND METHOD

RELATED APPLICATIONS/PRIORITY CLAIM

This divisional application claims priority under 35 USC 119(e) and 120 from U.S. patent application Ser. No. 11/590,070 entitled "Segment Matching Search System and Method" filed on Oct. 30, 2006, which in turn claims priority under 35 USC 119(e) and 120 from U.S. Provisional Patent Application Ser. No. 60/731,431 entitled "Search and Patterns in Wolverine" filed on Oct. 28, 2005 which is incorporated herein by reference.

GOVERNMENT LICENSE RIGHTS

The U.S. Government has a paid-up license in this invention and the right in limited circumstances to require the patent owner to license others on reasonable terms as provided for by the terms of FA8750-04-C-0237 awarded by the United States Air Force.

APPENDIX A

Appendix A contains the source code for an example of an implementation of a graph schema parser and lexer, a graph normal form schema generator and a search pattern parser and lexer.

FIELD OF THE INVENTION

The invention relates generally to a system and method for rapidly searching large element sets.

BACKGROUND OF THE INVENTION

A search is a methodology to find a match to a particular pattern. In the commercial context, a well known search engine, such as Google, parses a set of search terms and returns a result list of items (web pages in the typical Google search) that are sorted in some manner. In the government context, search systems exist that attempt to search through a vast amount of information to detect instances of suspicious activities in which a technique known as segment matching may be used. Thus, a search may be characterized as essentially a bottom-up matching problem where the form of the query drives what the basic segment matching strategy needs to do. In bottom-up matching, one describes patterns (i.e. queries) that allow us to take the matches from lower levels in a query and further constrain the results (i.e. match context) using additional information and patterns. For example, we can define constraints or additional relationships (e.g. edges) on elements from lower levels.

It is desirable to provide a mechanism for searching large data sets using pattern matching. The need for pattern matching in large data sets has been steadily increasing in both the intelligence communities as well as in the commercial setting. In many cases, the size of collected data sets present significant challenges for any type of search technology. Additionally, there exists a constant tension between several of the characteristics of search techniques. Specifically, a tension exists for most search technologies between computational efficiency, search query expressiveness, and the representational fidelity of a data set.

It has been shown in research that using graph-based representations of information is nicely applicable in a wide range of situations. However, typical graph-based search processes do not scale to large data sets in practice. Additionally, mechanisms exist in the graph search area that allow a person to specify search in the context of graph-based data, but many of these mechanisms also do not scale to large data sets. For example, sub-graph isomorphism is a well-defined method for specifying a search in a graph; it is also well-known that, in general, sub-graph isomorphism is NP-complete so that it is computationally inefficient.

Most research in graph algorithms has focused on creating, manipulating, and maintaining a complete graph data structure, and therefore the data is assumed to be contained in the main memory of a computer system. Due to this assumption, the large data sets cannot fit into the main memory of the computer system and therefore the large data sets have outgrown the known graph processes. It is desirable to perform a graph search on very large data sets. None of the currently available systems are able to handle larger searches such as 100 million elements. Furthermore, it is desirable to provide a search system that can handle the large searches without specialized hardware or software so that a typical relational database may be used with the search system. Thus, it is desirable to provide a search system and method that achieves these goals and it is to this end that the present invention is directed.

SUMMARY OF THE INVENTION

A segment matching search system and method are provided in which the graph search is encoded in a decision diagram. The decision diagram may be a data structure that results from a match between a search pattern and an input element set. In the embodiment, the decision diagram is a MatchDiagram data structure wherein paths through the decision diagram are matches to the pattern. The match diagram is preferably a directed acyclic graph (DAG) where a vertex represents an input node, an attribute from an input node or a Computed Value, and edges represent relationships that were either originally present in the input element set or have been derived during the matching process. The match diagram may be generated by a process in which a spanning tree for the input search pattern is generated. Then, the match diagram for the spanning tree is generated. Then, for each edge in the pattern that was not part of the spanning tree, the existence of the edge in the match diagram is validated. During the validation, rows from the match diagram are eliminated that reduce the match set.

The segment matching search system and method may be implemented in a computer system in which the segment matcher is one or more pieces of software. The segment matcher may include a search pattern compiler that generates an optimized search plan and a search engine that performs the segment matching on the optimized search plan to generate the match diagram. In one embodiment, the search engine is a virtual machine that executes a series of instructions (based on the particular search plan) to generate the match diagram. The system may also have a relational database that stores the data set as well as the other information associated with the segment matching system. The segment matching system permits a giga-graph search to be performed using a flexible search plan (optimized search pattern) that can automatically manage the search (including the database result sets) and replace many systems that would otherwise have to be hand crafted.

BRIEF DESCRIPTION OF THE DRAWINGS

FIG. 2 illustrates a schema for the graph of FIG. 1;

FIG. 1 is matched by the pattern in FIG. 3;

FIG. 9 illustrates a search envelope optimized using the search system of FIG. 6;

FIGS. 10A and 10B illustrate an example of a planning method used by the search system of FIG. 6;

FIGS. 19A and 19B illustrate an example of a database using the GNF format;

FIGS. 20A and 20B illustrate an example of a search pattern and search plan, respectively, written in PQL;

DETAILED DESCRIPTION OF AN EMBODIMENT

A search system and method for massive searches are described in which an input graph is used. It will be appreciated, however, that the system and method has greater utility since it may be used to search any size of corpus. In addition, input data elements sets other than an input graph may also be used with the search system as the search system is not limited to the input graph example described below. To better understand the search system and method, typed graphs and patterns will be described which are examples of the input data element set which is used to describe an example of an implementation of the system.

Figure 1:
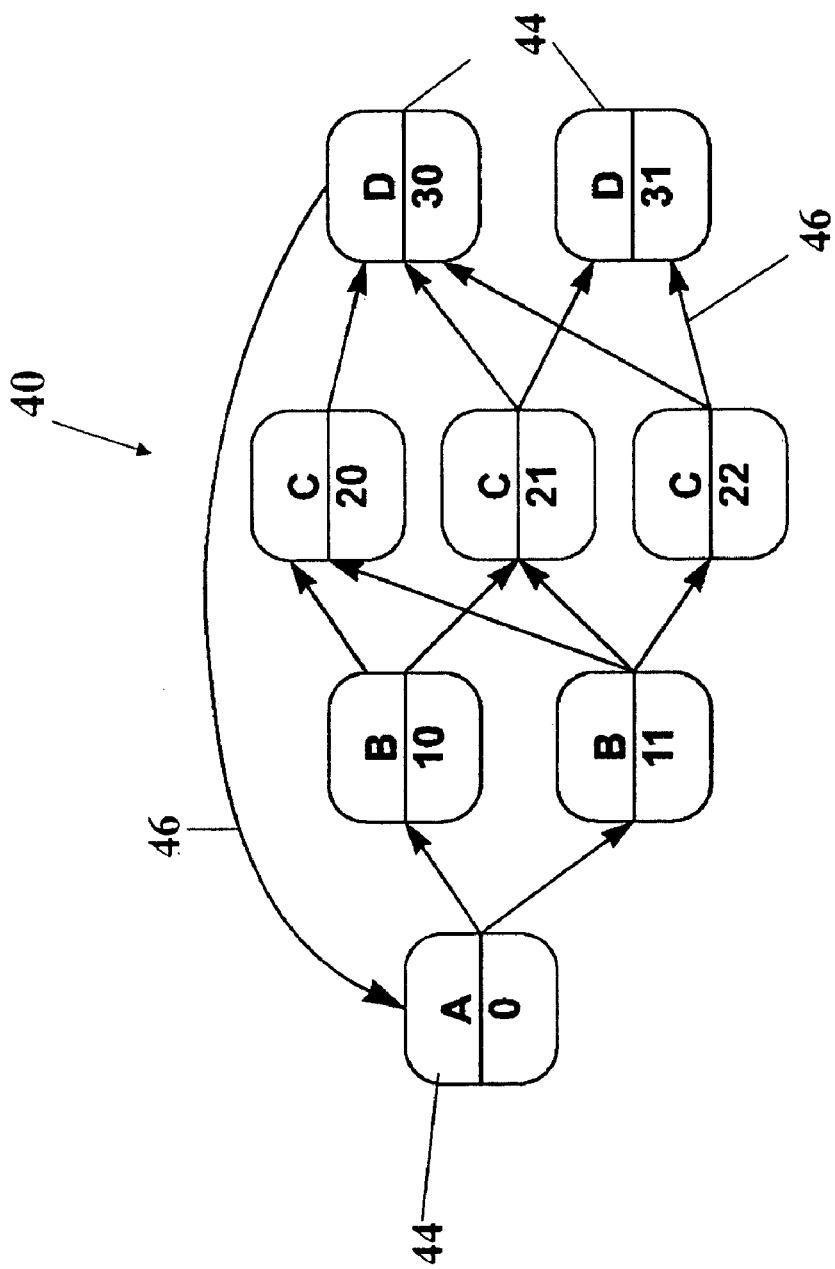
FIG. 1 illustrates an example of a typed graph.

FIG. 1 illustrates an example of a typed graph 40 and FIG. 2 illustrates a schema 42 for the graph shown in FIG. 1. In this example graph, the node types are defined by the letters (A, B, C, D) and node identifiers are given as numbers. This schema does not support edge attributes, but rather we support relationship attributes where edges can be elements of a relationship. The schema for the FIG. 1 example is shown in FIG. 2. In the graph and the search system, edge attributes of a graph are not supported since edges with attributes should be treated as a special case of a binary relationship where each element in the relationship can have attributes. If the relationship has more degrees (e.g. ternary), using an edge as a representational construct becomes somewhat difficult to visualize and rationalize and significantly increases the complexities of the system. However, those relationships can be supported by another graph abstraction layer that provides an edge-node-edge transformation that would compress or uncompress the special form of the binary relationship.

As shown graphically in FIG. 1, the graph has one or more nodes 44 that are connected by one or more edges 46. Each node has a class (such as A, B, C or D in the example) and a value (0, 10, 11, etc in the example) associated with it. Each edge 46 represents a relationship between two nodes wherein those relationships are defined in the graph schema 42 shown in FIG. 2. This graph-based representations of information, in combination with the search system and methodology described below, permits very large data sets to be searched without the typical problems associated with graph-based representations and large data sets.

Figures 3, 4:
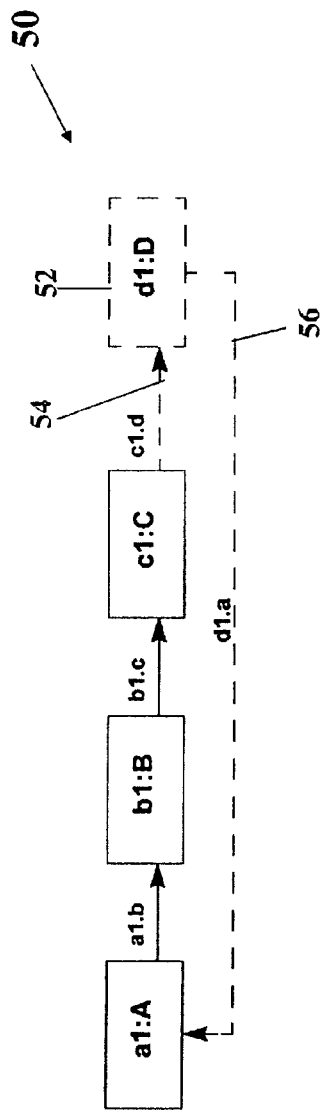
FIG. 3 illustrates an example of a pattern.
FIG. 4 illustrates a set of matches where

The graph-based representations of information can be searched using a pattern. FIG. 3 illustrates an example of a pattern 50 that may be used to search the graph-based representations of information. A more detailed example of a pattern and how it can be used to search (perform segment matching) is set forth below. The simple pattern shown in FIG. 3 allows the system to match nodes of specific types where a d node 52 and the d→a and c→d edges 54, 56 are optional. Given the input graph shown in FIG. 1, FIG. 4 illustrates a set of matches for the pattern shown in FIG. 3.

Figures 5, 6:
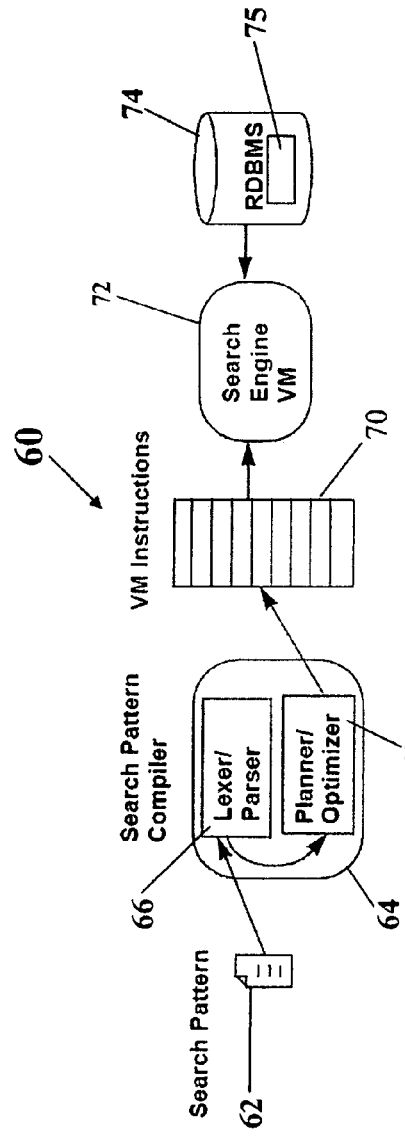
FIG. 5 illustrates a text form of the pattern of FIG. 3.
FIG. 6 is a block diagram of an implementation of a search system using graphs.

An important design goal for the search system is to provide the ability to have a complete linguistic specification independently from any visualization needs. Specific visualizations are useful for task oriented problems and serve as an abstraction mechanism that makes specific tasks easier by elucidating certain relationships that otherwise might become hidden. For example, understanding a schema or pattern can be substantially easier with visualization aides. However, the system needs to have a completely sound underlying representation for all of the constructions. In FIG. 5, a complete textual form of the pattern from FIG. 3 is shown. In this example, the pattern has variables bound for different nodes but not for edges. A pattern can however restrict a match only to edges that are connected via a specified relationship. For example, a pattern can specify A node types connected to B node types only via the b relationship. Further details of the patterns used by the search system are described below in more detail.

Prior to describing an implementation of an embodiment of the search system and method that uses the segment matching in more detail, the problems solvable using the segment matching-based search system are described. Segment Matching is a search methodology that provides analogous capabilities to database query engines used in database management systems (DBMS). Segment Matching can be used to search through large volumes of structured data to identify a set of results. Each result in the result set satisfies the properties specified in a search pattern. For example, given an appropriately formatted database of paleontology information (an example of which is shown in FIGS. 19A and B and described below), one could use Segment Matching to search for "all dinosaurs that may have preyed on Triceratops". The database in FIGS. 19A and 19B, for illustration purposes, is shown in a graph normal form (GNF) which is described below although the segment matching technology can also be used to retrieve and search information stored in other formats, including industry-standard relational DBMS. As shown in FIGS. 19A and 19B, the database has a schema that defines the attributes that each entity (or "object") within the database will have, and what relations exist between entities with the schema being organized as a set of "node types" and "edge types". For the example in FIGS. 19A and 19B, the schema will define node types for, Species, Family, Period, and Continent.

To conduct this search, the user must provide a search pattern and search plan (an example of which is shown in FIGS. 20A and 20B and described below). The search pattern describes what the user is looking for. In the search system, this pattern is expressed using a pattern query language (PQL) that is described below in more detail. In a traditional DBMS, the pattern would be expressed using SQL (an industry-standard search language for structured data). The Segment Matching technology could be used in conjunction with either PQL or SQL search patterns. For purposes of illustration, the segment matching using the PQL patterns is described. In the example in FIG. 20A, the search pattern is to find dinosaurs that might be preyed on by a triceratops which requires that we identify carnivorous dinosaurs that lived during the same time period and the pattern consists of five nodes as shown in FIG. 20A. Once a search pattern has been defined, the Segment Matching technology must parse and compile the pattern into a sequence of Segment Matching operations. Segment Matching operations are search primitives analogous to (but distinct from) the select and join operations of SQL. A pattern compiler is used to compile PQL patterns. The output of the pattern compiler is a Segment Matching Plan (an example of which is shown in FIG. 20B), or simply a plan. In many cases, there will be multiple possible plans for the same pattern. Some plans may be more efficient than other plans even though the plans produce the same result set. The plan is then executed by the Segment Matching engine discussed below in more detail. The engine accesses the data from the storage system. For illustration purposes, the graph normal form (GNF) storage system is described although the segment matching technology can also be used to retrieve and search information stored in other formats, including industry-standard relational DBMS.

As the data is retrieved from the DBMS, the data is represented internally as a set of tuples. Tuple is a term in standard usage by the database industry. It is generally understood as a single row within a table stored within the database. However, the proper definition of a tuple is any collection of identified attribute values. For example, (species1=Triceratops, period=Cretaceous, species2=Tyrannosaur) is a tuple with three values where each value is identified by its attribute. The significance of the distinction is that a table suggests that the values within a tuple are ordered in some fashion. A tuple is not required to be ordered, in fact (period=Cretaceous, species1=Triceratops, species2=Tyrannosaur) is precisely the same tuple with the attributes listed in a different order. Recognizing that tuples do not need to be stored in tables is important towards understanding Segment Matching technology.

One feature of the segment matching system is that sets of tuples are represented using a symbolic format called a match diagram. The Match Diagram is a much more compact format than a table. The Match Diagram also permits many operations on the set of tuples, such as sorting the tuples, counting the tuples, computing projections of the tuple space, etc. to be performed much more efficiently than is possible using a table format. Each of the Segment Matching operations contained in the search plan will either create a Match Diagram or will transform some existing Match Diagram in some way. The result of executing all of the operations in a properly constructed plan is a single Match Diagram that contains exactly those tuples that satisfy the criteria from the search pattern. The final Match Diagram can be converted into a table of results for presentation to the user, or can be saved in its symbolic form for use in subsequent searches.

In summary, the Segment Matching Technology is useful when searching structured data sets (e.g., databases) for results matching some search criteria. The use of a Match Diagram during the search permits Segment Matching to execute much faster and to consume fewer computational resources (i.e., computer memory) than currently known competing technologies (e.g., DBMS from companies such as Oracle and IBM). Furthermore, other components of search technology, such as the GNF storage format and the PQL pattern language also complement the Segment Matching technology enabling it to be easier to use (PQL), widely applicable (GNF) and more fully optimized (both PQL and GNF contribute to the overall performance of Segment Matching by ensuring that the data format and the search patterns are well matched to each other and thus Segment Matching plans are likely to be more highly optimized when produced for a search environment than if used in a traditional relational DBMS with SQL). Now, an example of the search system that uses graphs and patterns to perform segment matching for large data sets is described in more detail.

FIG. 6 is a block diagram of a search system 60 in accordance with the invention. The system uses a combination of relational database technology and search technology based on graph matching concepts. The system may accept one or more search patterns 62 (an example as shown in FIG. 3 and further examples are described below) that is used to segment match (search) a data set 75 in a data storage system 74, such as a relational database management system (RDBMS) in one embodiment, wherein the data is represented as a graph. The search patterns are input into a search pattern compiler 64 that compiles the one or more search patterns into a search plan (i.e. a set of abstract instructions). In more detail, the search pattern compiler 64 may have a lexer/parser 66 and a planner/optimizer 68 through which each search pattern is routed. The lexer/parser may parse out the search pattern to identify particular variables and aspects of each search pattern while the planner optimizer generates a search plan and then optimizes that search plan as described below. Then, the search plan is sent to a set of instructions 70 that are part of a search engine virtual machine 72. The instructions perform the segment matching of the pattern to the data set (graphs) 75 wherein a particular set of instructions contained in the search engine virtual machine based on the search plan and the graphs being searched. As shown in FIG. 6, the plan generation (that occurs in the search pattern compiler 64) is decoupled from search execution (carried out by the search engine virtual machine 72) so that the system can introduce many kinds of optimizations and correctness checks (during the planning process) that would otherwise be difficult to do in a pure graph algorithmic approach.

Figure 7:
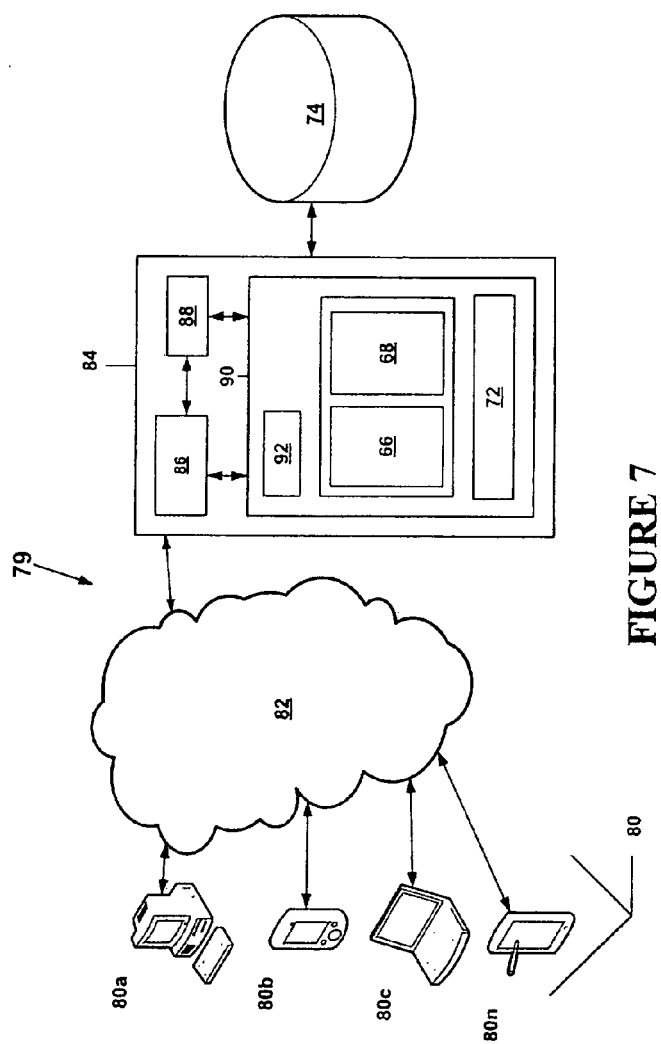
FIG. 7 illustrates an example of a computer system that implements an embodiment of the search system shown in FIG. 6.

FIG. 7 illustrates an example of a computer system 79 that implements an embodiment of the search system shown in FIG. 6. In the embodiment, the search system is implemented in software that is being executed by the computer system although other implementations are within the scope of the invention such as implementing the search system on a hardware device or a combination of hardware and software. In the example in FIG. 7, the search system is implemented in a client/server type architecture over a network 82 that is a wide area computer network. However, the system may be implemented using other computer architectures (for example, a stand-alone computer, a mainframe system with terminals, an ASP model, a peer to peer model and the like) and other networks (for example, a local area network, a wide area network, the internet, a wireless network, a mobile phone network and the like), and those other implementations of the search system are within the scope of the invention since the invention is not limited to any particular computer architecture or network.

The exemplary system shown in FIG. 7 may have one or more client devices 80, such as a desktop computer 80a, a PDA or handheld device 80b, a laptop computer 80c and a tablet computer 80n, that communicate over a network 82 with a main computer 84 that may preferably be a server computer. The client devices may broadly be any device with sufficient computing power, memory and connectivity to be able to interact with the server to submit a set of search patterns and receive search results from the search system. The main computer 84 may have one or more processing units 86, a persistent storage unit 88 and a memory 90 that stores the pieces of software being executed by the processing unit 86 of the main computer. To implement the search system, the memory may contain an operating system 92, the search pattern compiler 64 with its sub-modules 66, 68 and the search engine virtual machine 72, and the main computer may be coupled to the data store 74. In this exemplary implementation, the search pattern compiler is a plurality of lines of computer code that implement a planning method of the system as described below wherein the parser 66 and the planner/optimizer 68 are both also a plurality of lines of computer code that implement the parsing functions and the planning and optimization functions of the system. Similarly, the search engine virtual machine 72 is a plurality of lines of computer code that implement the virtual machine instructions as well as the other functions of the search engine described below.

Figure 8:
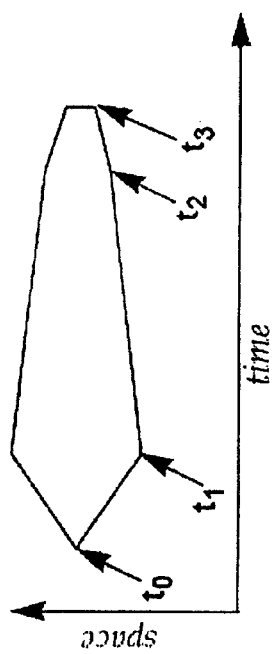
FIG. 8 illustrates a typical search envelope.

The graph-based search approach of the search system shown in FIG. 6 allows the system to create a flexible search plan that can automatically manage the search (including the database result sets) and replace many systems that would otherwise have to be hand crafted. In a typical system, most complex information search using a database requires the construction of specialized software systems to effectively manage the multiple results sets from the database (e.g. traditional IT and Enterprise systems must do this) which is effectively handled by the search system. To further enhance the search system, the system organizes the work done during search to minimize time and space wherein the search is an envelope that the search engine manages over time. An example of that envelope is shown in FIG. 8 when using join operations in a relational database. The points in the envelope $t_0$, $t_1$, $t_2$, and $t_3$ represent how large the envelope is at various times and where substantial increases or decreases in space occur. It is known that how the search is structured has a profound impact on the profile of the search envelope and the search system decreases the space dimension as aggressively as possible as well as reduces the time it takes to achieve the answer as shown in FIG. 9. The time and space of the search is reduced when the both search plan is optimized and the search methodology (described below) is optimized.

FIGS. 10A and 10B illustrate an example of a planning method 100 used by the search system of FIG. 6 wherein FIG. 10A illustrates the planning method and FIG. 10B illustrates more details of the static plan optimization that occurs during the planning The planner generates a matching plan that is a sequence of segment matching operations that may be carried out by the segment matcher core since the core is a general segment matching process. Typically, the plan will be produced for one specific pattern, and it represents a "custom matching algorithm" specific to that pattern.

The process or piece of software that produces a plan for a pattern is called the "planner" which is shown in FIG. 6. In one embodiment, the planner is a piece of software (with a plurality of lines of code) that are executed by a processor to implement the steps of the planning described below. However, the planner may be implemented in other manners that are within the scope of the invention. The planner's goal is to construct and then reorganize a MatchDiagram data structure so that every pair-wise relationship in the pattern is eventually tested. Ideally, the planner should produce plans that are optimally efficient, but to simply get the correct matches to a pattern, the planner simply needs to ensure that enough segment matching operations are performed so that every edge in the pattern is eventually captured by a Link in the diagram.

Match Diagram

The Match Diagram data structure is an innovative data structure the represents a set of tuples. For purposes of illustration, a particular implementation of the match diagram is shown and described although the match diagram can be implemented in other ways that are within the scope of the invention. The salient characteristics of a Match Diagram are:

One or more linked tables. Each table contains a projection of the tuple space onto one or more attributes. In one implementation, the tables can be realized using traditional database tables, with one row for each tuple in the projection and one column for each projected attribute. In many cases, a table will contain only one column. The set of attributes in the tuple space must be partitioned across the tables—in other words, each attribute in the tuple space is contained in the projection of exactly one table.

Zero or more links such that each link connects exactly two tables. All of the tables in the match diagram must be connected (directly or indirectly) to every other table in the diagram through links In a properly formed Match Diagram, the links will not create cycles. If cycles are present, then the Match Diagram is ill-formed and the cycles must be removed through Match Diagram Transformations before the tuples represented by the Match Diagram can be examined. Note that if there are n tables in the diagram, there must be n−1 links in any well-formed Match Diagram.

Links define arbitrary binary relations between the tables. In other words, given a link that connects table A to table B, then the link describes how each row in table A is connected to zero or more rows in B. The relation can be many-to-many—that is, each row in B is also connected to zero or more rows in A.

The contents of a Match Diagram are a set of tuples. The set is sometimes referred to as the tuple space of the Match Diagram and the set can be enumerated by traversing the tables and links in the match diagram. Enumeration of the tuples begins by selecting one table as the "root" of the diagram. Once a root table has been identified, then all of the links connected to this table become "directed away" from the root. The root then becomes the "parent table" of all of the other tables connected to the root (which become "child tables"). Links connected to the children of the root are then similarly directed away from the root, and so on, until the Match Diagram has taken on the characteristics of a tree data structure.

Recall that every table in the Match Diagram describes a projection of the tuple space onto some subset of the attributes. Once all the links have been directed such that the Match Diagram has taken on a tree structure, then each subtree within the Match Diagram describes a projection of the tuple space onto the subset of the attributes from tables within the subtree. The precise makeup of the projection described by a subtree is defined by the recursive application of the following rule If S is a projection described by a subtree rooted at parent, and T is a projection described by a subtree rooted at child, then the projection defined by the tree rooted at parent with link R connecting parent and child (note that child may have siblings in the tree) consists of the set {(a, b) where (s∈S and s=(p, q), t∈T and t=(c, d) and there exists some r in R that connects p to c). The notation (x, y) indicates a tuple formed by concatenating two tuples x and y.

Thus, the projection consists of tuples taken from the original parent tree (i.e., s∈S) concatenated with tuples taken from the child (i.e., t∈T). The projection only includes those combinations of tuples from the parent and the child that are connected by the link. In other words, each tuple, s, in the original parent tree will consist of some concatenation of a row from the parent table p and some other tuple q (s=(p,q)). If child has no siblings, then q will be nil.

Similarly, each tuple described by the original child tree will consist of some row c from the child table concatenated with some other tuple d. If the child tree consists of just one table (i.e., if the child table is a "leaf") then d will be nil. The tuple (s, t) is part of the set of tuples described by the final match diagram if and only if link R connects row p in the parent to row c in the child.

The use of this rule is illustrated by the following example. For brevity, the attribute names are not shown in the tuples. Thus the notation (Sauropod, Apatosaurus) is shorthand for (family=Sauropod, species=Apatosaurus).

TABLE 1

| Row 0: | Sauropod |
| Row 1: | Ceratopsid |

Table 1 describes two tuples, each tuple is just a single value and the two tuples are (Sauropod) and (Ceratopsid).

TABLE 2

| Row 0: | Triceratops |
| Row 1: | Apatosaurus |

With a directed link from Table 1 to Table 2 consisting of the following pairings (0,1) and (1,0). The set of tuples in the tree, consisting of Table 1 and Table 2 with Table 2 is the root, are (Sauropod, Apatosaurus) and (Ceratopsid, Triceratops).

TABLE 3

| Row 0: | Jurassic |
| Row 1: | Cretaceous |

With directed links from Table 3 to Table 1 consisting of the following pairings (0,0), (0,1) and (1,0). The set of tuples in the tree, consisting of Tables 1, 2 and 3 with Table 3 as the root, are (Jurassic, Sauropod, Apatosaurus), (Jurassic, Ceratopsid, Triceratops) and (Cretaceous, Sauropod, Apatosaurus).

TABLE 4

| Row 0: | Flowers |
| Row 1: | Leaves |

With directed links from Table 3 to Table 4 consisting of the following pairings (0,1), (1,0), (1,1). The set of tuples in the tree, consisting of Tables 1, 2, 3 and 4 with Table 3 as the root, are (Jurassic, Sauropod, Apatosaurus, Leaves), (Jurassic, Ceratopsid, Triceratops, Leaves), (Cretaceous, Sauropod, Apatosaurus, Flower) and (Cretaceous, Sauropod, Apatosaurus, Leaves).

A Match Diagram is said to be "reduced" if there are no unconnected rows or unconnected edges in the Diagram. An unconnected row is a row in a table which does not appear at least once in every link connected to that table. An unconnected edge is an edge in a link which references a table row that no longer exists (presumably because the row has been removed from the Match Diagram).

A reduced Match Diagram provides the following properties

1. The number of tuples contained in the Match Diagram is at least as large as the number of edges in the largest link. The number of tuples can be much larger as described below.

2. The number of tuples contained in the Match Diagram can be computed in time proportional to the total number of edges in the Match Diagram. The computation involves both addition and multiplication operations and is generally much faster than counting the tuples. Similar techniques can be used to compute the sum of the values of an attribute and to perform other aggregate computations (e.g., average, minimum, maximum, etc).

3. If the tuples in the root table are sorted, then when the full set of tuples are enumerated they will also be sorted by the attribute(s) contained in the root table. Since any table can be selected as the root, the tuples in a Match Diagram can be sorted based on any attribute value. The cost for sorting the tuples in a Match Diagram is determined by the cost of directing the links away from the newly selected root. Using the algorithm described below, the time required for this task is directly proportional to (i.e., linear in) the number of edges contained in the Match Diagram. Hence, the tuples can be sorted by any attribute in linear time.

4. The Match Diagram can be manipulated directly, adding or removing rows from tables or edges from links or even adding new tables to the diagram. These manipulations change the set of tuples described by the diagram in predictable ways. Proper use of such manipulations allows the Match Diagram to be used to "search" the database.

Match Diagram Characteristics

A Match Diagram achieves encoding efficiency from two potential sources, each of which can result in tuple sets that are exponentially larger than the match diagram itself. The first source of efficiency is sequences of links in the diagram. Consider three tables, with attributes A, B and C, linked in a sequence where A is the parent of B and B is the parent of C. For simplicity, assume that B consists of only a single row, while A and C each have N rows. The link connecting A to B is said to have "fan-in" since there are many rows from A connected to the single row in B. By contrast, the link connecting B to C is said to have "fan-out" since the single row in B is connected to many rows in C. The set of tuples described by this Match Diagram consists of choosing one of the rows of A, concatenating the tuple in B and then concatenating one of the rows in C. Since there are N choices for each of the A and C tables when producing tuples, the set will have N×N, or $N^2$ tuples. Note that the match diagram itself contains only 2N+1 projected tuples and 2N edges.

In general, each row in a parent table will be connected to one or more rows in the child table. The number of child rows connected to a single parent row is referred to as the "out-degree" of that parent row. The term "in-degree" is used to describe the analogous quantity of the number of parent rows connected to a single child row. The term "degree" is used when the reference to out-degree or in-degree is clear by context, and in almost all cases will be referring to the out-degree. Note that each row may have a different degree—some rows may have degree 1, and others may have degree N.

Consider the case of p+1 tables joined in a chain by p links where table $t_0$ is the root table in the sequence, and $t_i$ is the parent of $t_{i-1}$ for all i between 0 and p−1. Let $d_i$ denote the out-degree of the link connecting $t_i$ to $t_{i+1}$ and assume that $d_i$ is the same for all rows in $t_i$. Let $n_i$ denote the number of rows in table $t_i$. Then the number of tuples in the subtree is $n_0$ ($d_0 \times d_1 \times \ldots d_{p-1}$). For the example above, we have three tables and two links. The relevant values are $n_0$=N, $d_0$=1 and $d_1$=N, and the number of tuples is N×(1×N)=$N^2$. If all the links have the same out-degree for all rows, (some constant d), then the number of tuples is given by $n_0 d^P$. If we assume that all tables have the same number of rows (some constant n), then the size of the Match Diagram is limited to the space required to represent n×d edges in each of the p links (pnd edges total) and to represent n rows in each of the p+1 tables. The asymptotic space complexity of the Match Diagram is thus at worst O(pnd). Note that the asymptotic space complexity of a table representing the same tuples would be at least $\Omega(pnd^P)$ since the table must have $nd^P$ rows (one row for each tuple) and must have at least p+1 columns (one column for each attribute, and there must be at least one attribute for each of the p+1 tables used in the Match Diagram).

The space complexity of a table is minimized when either d or p is equal to 1 (i.e. either there is no fan-out on any of the links, or there is exactly one link). In either case, the space complexity of the Match Diagram and the equivalent table are the same at Θ(pnd). When both d and p are larger than 1, the space complexity of the Match Diagram will always be superior by an exponential factor than the equivalent table representation, where the exponential term is $d^{(p-1)}$. In practice, the value of d can easily exceed 10, and chains of two and three links are commonplace. Hence the Match diagram can frequently be hundreds or even thousands of times more efficient than a table representation of the same information.

The second source of efficiency occurs when two or more children are linked to the same parent. In this case, the tuples in the tree are constructed from the Cartesian product of the tuples in each of the child trees. Hence, the number of tuples is given by the product of the out-degrees of the links. If we assume that the parent has n rows, that out-degree for link i is a constant $d_i$, then the number of tuples contained in the tree is n ($d_0 \times d_1 \times \ldots d_{p-1}$). If all links have the same out-degree, then the number of tuples is given by $nd^P$. As before, the space complexity of the Match Diagram is at worst O(pnd), while the equivalent table requires at least $\Omega(pnd^P)$ space.

Figure 21:
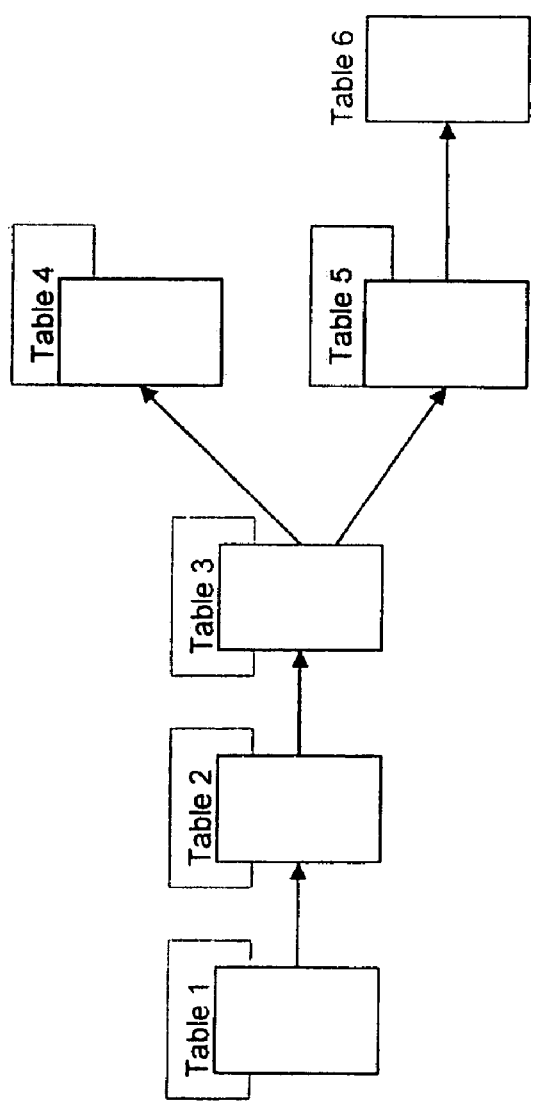
FIG. 21 illustrates a match diagram coding efficiency example.

A Match Diagram can exhibit both sources of coding efficiency simultaneously as demonstrated in the following example shown in FIG. 21. Note that there is no way to redirect the links in this diagram so that there is not at least one simple chain with two or more links, and at least one parent that has two or more children. If we assume that that the out-degree of all links shown in the table is a constant d, and that all tables have exactly n rows, then the diagram represents $nd^5$ tuples, where each tuple has at least six attributes. The space complexity of the Diagram is determined by the O(nd) space required for each of the five links, where as a table would require $\Omega(nd^5)$ space to store each of the six columns.

Computer Representation of Match Diagrams

Tables—Tables in the Match Diagram can be represented either directly or indirectly. Directly represented tables can be located in primary storage (i.e., RAM) on secondary storage (disk), stored remotely (accessed over a computer network), or in several other possible means. The indirect representation could be implemented as a nested Match Diagram or could be expressed as queries that can be applied to an external database (e.g., SQL expressions). The only requirements that the representation must satisfy for tables are:

1. The table must be a set of tuples that can be enumerated in some repeatable order
2. It must be possible to refer to a specific tuple using the position that tuple appears in the enumeration sequence—i.e., every tuple must have a unique "row number".

It is advantageous (many of the transformations may be implemented more efficiently) when it is possible to determine the number of rows in the table without being forced to first enumerate all the rows. Note that being able to determine the number of rows would only a concern for the indirect representations. There is additional value provided when the sequence is sorted by one or more attribute values of the tuples. In many cases, the most efficient Match Diagram representation will use tables that have only one attribute each, and that each table is sorted.

The definition of a Match Diagram suggested that tables do not contain duplicate values since each table is a projection of the tuple space. However, the representation of the table may contain duplicate values provided that either the representation of the table or the representation of the links ensures that the duplicates are removed when the diagram is traversed. The representation of tables may also make use of a special value (e.g., a "nil") that may indicate that a row in the table has been removed. The representation must ensure that nils are not included when the Match Diagram is traversed, and that edges connected to any row marked as "nil" are not traversed.

Links—As with the Tables above, the links can be represented either directly or indirectly as described above. Each link contains a set of edges, where each edge contains one reference to a row in each of two tables. The row references can be implemented as an integer value—i.e., the row number within the table. The row references could also be the address of the row within the computer memory—i.e., a pointer to the row. Several operations on links are more efficient if the edges within the link are sorted. One possible sorting is to use the row number of the parent table as the primary sorting key, and to use the row number of the child table as the secondary sorting key. The remainder of the discussion of links will assume this sorting order, although other sortings are also possible.

When the edges are sorted, the row numbers can be compressed in several possible ways. Compression is facilitated by storing the row numbers that reference the parent table in a different data structure (e.g., a different array) than the row numbers referencing the child table. Note that, if the edges are sorting as described above, then the sequence of row numbers for the parent table is redundant with the out-degree of the parent table. For example, if the edges in the link were {(0, 0), (0, 1), (1, 1), (2, 0), (2, 3), (3, 2)} then row references to the parent table are (in sequence) {0, 0, 1, 2, 2, 3}. Note that there are two zeros in this sequence corresponding to the fact that row 0 in the parent table has out degree two. Similarly, there is only one 1 in the sequence, since row 1 has out degree one. In many implementations it can be more efficient to store the out-degree for each row in the parent table in lieu of the row references. By contrast, the row references to the child table are more random. For this example, the sequence of child row references is {0, 1, 1, 0, 3, 2}. The remainder of the discussion will assume that child row references are uncompressed and stored in an array data structure in sequence corresponding to the edges being sorted as described above.

Note that computing the parallel prefix of the out-degree for the parent table can provide "random access" to the set of edges connected to any row in the parent table. For this example, the out degree is the vector {2, 1, 2, 1}. The parallel prefix of this vector is {0, 2, 3, 5, 6}. The last value in this sequence, 6, corresponds to the number of edges in the link. Every other value, $x_i$, in the parallel prefix is the position within the original edge sequence of the subset of edges connected to parent row i. For example, to determine the edges connected to row 2 in the parent one must simply discover that $x_2$ in the parallel prefix is equal to the value 3. Knowing this fact, and the fact that the out degree of row 2 is equal to two is sufficient to reconstruct the edges (2, 0) and (2, 3). The child row numbers are obtained simply by indexing into the array of child row references starting at position $x_2$ and continuing until all of the edges (two, in this case) have been produced.

Some implementations may elect to store only the parallel prefix information, since the out-degree is easily computed for any row i simply by subtracting $x_i$ from $x_{i+1}$. Also note that the first value in the parallel prefix is always zero, and thus need not be stored explicitly.

The Shortcut Representation for Links

The remainder of this discussion assumes that links are stored using a pair of arrays. One array, called the "shortcut array", will have as many elements as there are rows in the parent table. This array will contain the parallel prefix of the row references to the parent table from the sorted edge set. The other array, called the "destination array", will have as many elements as there are edges in the link. This array will contain the actual row references from the edges in the order they appear in the sorted edge set. The edge set itself is not represented. Note that the number of bits required for each element shortcut array is at most the logarithm base 2 of the number of edges in the link. The number of bits required for each element in the destination array is at most the logarithm base 2 of the number of rows in the child table.

Reversing a Link

Recall that a Match Diagram permits links to be redirected—the two tables connected to a link can arbitrarily be selected as which one is the parent and which is the child. The shortcut representation of a link encodes the parent row references differently than the child references and hence a link would have to be re-encoded if the parent and child are reversed. This operation can be performed in time proportional to the number of edges in the link (i.e., with linear time complexity) using the following algorithm. Note that the techniques for sorting data sets in widespread use today usually require time complexity of $\Omega(N \log N)$. The reversal algorithm is based in some respects on a radix-based sorting algorithm. The technique relies on the fact that the row-references in the link are "dense". That is, the number of distinct rows that can be referenced by a link is no larger than the number of edges in the link. This condition is always satisfied when the Match Diagram is reduced.

The first step in the reversing algorithm is to compute the histogram of the destination array. The histogram is, naturally, an expression of the "in-degree" of the link for each row in the child table. The second step is to compute the parallel prefix of the histogram (i.e., the parallel prefix of the in-degree). The parallel prefix will be used to provide random access to a position in the reversed link of where the first edge will be stored for each row in the child table. For example, if the in-degree for child row 0 is five, then once the link is reversed, the first five edges (positions zero through four) will be for edges from row 0, and the first edge from row 1 will be stored in position five.

The third step in the algorithm is to create a new destination array and then to populate this array with values obtained by traversing all the edges in the original link (in their original sorted order). For each edge (s, d) that is visited, the value s (a row reference to the parent table) is written into a new destination array at the position $x_d$ where x is the parallel prefix array computed in step 2. After this value is written into the array, $x_d$ is incremented. In this manner, if some subsequent edge (s', d) is visited, then the value for s' will be written into the new destination array in the position immediately followings.

After completing step 3, the new destination array correctly represents the destination array for the reversed link. The parallel prefix array, x, has had each of its elements incremented precisely as many times as the in-degree of the corresponding child table row. Hence, $x_i$ is a shifted copy of the parallel prefix without the leading 0, and thus correctly represents the shortcut array for the reversed link. Hence the final step in reversing the link is to replace the original shortcut and destination arrays with the parallel prefix array and new destination array computed during step 3.

The time complexity for this algorithm is $\Theta(R_p+R_c+E)$ where $R_p$ and $R_c$ are the number of rows in the parent and child tables respectively and E is the number of edges in the link. Note that if the Match Diagram is reduced, then the number of rows cannot exceed the number of links, and hence the algorithm has time complexity $\Theta(E)$ in this case.

Returning to FIG. 6, the planner is executed when a search pattern 62 as shown in FIG. 6 is input into the planner. In step 102, the planner may perform an parsing operation in which the search pattern is checked for errors and formatted so that the planner/optimizer can performs its operations. In step 104, the planner/optimizer begins plan optimization that consists of static optimization in step 106 and dynamic optimization in step 108. During the plan optimization, the matching primitives (the instructions shown in FIG. 6) are organized and generated to create an optimized plan. The matching primitives can be divided into three classes: 1) instructions that increase the size of the search space; 2) instructions that decrease the size of the search space; and 3) instructions that do not affect the size of the search space but instead transform the data structures in which the search space is encoded. During the optimization, the optimal combination of these three types of primitives is determined. At first glance, it would appear that an optimal plan should issue instructions that decrease the size of the search space as early and as often as possible. However, these instructions can be issued only when the search space is encoded to have specific properties. Hence, reduction operations have transformations as prerequisites. Since the transformation instructions generally increase the size of the explicitly encoded part of the search space, each transformation results in increasing the time complexity of the subsequent instructions.

Match Diagram Transformations

The utility of the Match Diagram data structure is greatly enhanced by the capability of performing transforms on the data structure. These transforms may alter the set of tuples represented by the Match Diagram in some predictable way, alter the structure of the Match Diagram by changing which tables are linked to which other tables, or both. The possibility of transforming the Match Diagram renders it feasible to conduct complex searches over structured data sources very efficiently.

Microscopic Transformations

The Match Diagram may be manipulated at the level of individual rows and edges in the data structure. For example, a new row may be added to a table, or a new edge added to a link. The attribute value in a row may be changed, or an edge could be removed from a link, and so on. These changes are referred to as microscopic changes because they will affect only a fraction of the tuples in the set.

Macroscopic Transformations

Transformations that operate on an entire table, on an entire link, or on multiple tables and/or links are referred to as macroscopic transformations. A macroscopic transformation has the capacity to change every tuple in the set represented by the Match Diagram. The illustrative examples of the macroscopic transformations described below are merely illustrative of the transformations that are part of the segment matching system and the segment matching system is not limited to those exemplary transformations as is known to those skilled in the art. An example of a macroscopic transformation is creating a new link that connects two (previously unconnected) Match Diagrams.

Add Link—This transformation installs a new link between two tables. In order for the result of the transformation to be a properly formed Match Diagram, then the two tables must have been part of two different Match Diagrams before performing the transformation (otherwise the new link will produce a Match Diagram containing a cycle). The addition of the link creates a combined Match Diagram that describes a subset of the Cartesian product of the original two Match Diagrams. The specific subset that is described depends upon the edges in the link. If the original Match Diagrams were A and B respectively, and if the link was created joining table $T_a$ in A to table $T_b$ in B, then the tuples in the resulting Match Diagram will consist of a tuple, a, from A concatenated with a tuple, b, from B such that a includes a row from $T_a$ that is connected by the link to some row from $T_b$ that is included in b. This transformation will generally produce a Match Diagram having more tuples than were present in either of the original diagrams. For this reason, it is an example of an expanding transformation.

Constrain Link—Applying a constraint to two linked tables in the Match Diagram. All edges that connect rows which do not satisfy the constraint are removed from the link. This transformation removes tuples from the Match Diagram, hence it is an example of a contracting transformation. A special case of this transformation is to compute the intersection of two links. This special case allows two or more links to be superimposed so that the resulting connection between two tables satisfies the constraints for all of the links.

Figure 23A:
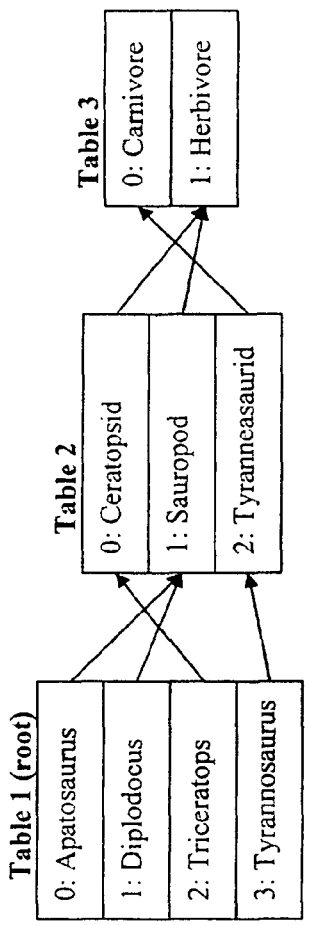
FIGS. 23A and 23B illustrate an example of a lift link transformation operation.
Figure 23B:
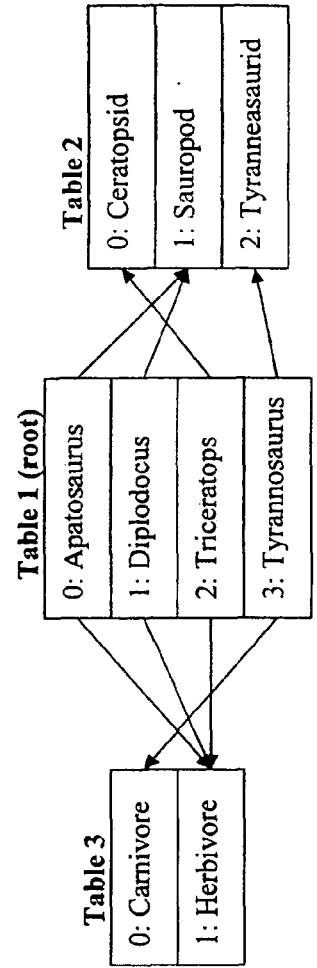

Lift Link—Replacing a link between a parent table and a child table with a link between the parent's parent table and the child (i.e., "lifting" the child so that it is attached to its grandparent). This transformation is an example of a closed transformation that does not affect the set of tuples represented by the Match Diagram. The requirements for this transformation are that the link between the grandparent and the parent must not have fan-out, and that the new link created between the grandparent and the child must be the composition of the original link between the grandparent and the parent and the original link between the parent and the child. Note that this transformation does not change the link between the grandparent and the parent. FIGS. 23A and 23B illustrate an example of a match diagram prior to and after a lift transformation, respectively. As shown in FIG. 23A, Table 1 is the root table. In FIG. 23A, the link between Tables 1 and 2 has the following edges (0,1), (1,1), (2,0) and (3,2) and the link between Tables 2 and 3 has the following edges (0,1), (1,1) and (2.0). In this table, the link between 1 and 2 is fan-out-free, therefore we can attach Table 3 directly to table 1 without changing the tuples represented by the Match Diagram which is shown in FIG. 23B after a lift transformation with Table 3 lifted and is now a child of Table 1. As shown in FIG. 23B, the link between Tables 1 and 3 has the following edges (0,1), (1,1), (2,1) and (3,0) and the link between Tables 1 and 2 has the following edges (0,1), (1,1), (2,0) and (3,2).

Link Promotion—This transformation is also a closed transformation, as it does not affect the tuples represented by the Match Diagram. Link Promotion replaces a link in the Match Diagram with a table, and connects the table to each of the two tables originally connected by the link. The number of rows in the new table is equal to the number of edges in the link being replaced. The table has no attributes when it is created (although attributes may be added subsequently as the result of other transformations)—i.e., the table does not contribute any values to the tuples represented by the Match Diagram. The new table is linked to the original parent and child tables as follows. Each edge (p, c) in the original link will correspond to a unique row r in the new table. The link between the new table and the parent table will include the edge (r, p). The link between the new table and the child table will include the edge (r, c). Note that both the link to the child table and to the parent table are fan-out-free links. After performing this transformation, the Match Diagram may no longer represent a tree, and so the diagram may not be in a form where the tuples cannot be enumerated until links are redirected to restore the tree structure.

NOTE: The transform may be applied in reverse. Any existing table may be partitioned into two tables with a new link created between the tables. One of the two new tables is arbitrarily chosen to be the parent the other table as the child.

Merge Tables—If two tables, parent and child, are connected by a fan-out-free link, and if the child has no descendant tables, then the tuples from the child table can be concatenated onto the tuples contained in the parent table. Each row, p, in the parent table will be replaced with the concatenation of that row and the row, c, from the child table such that the original link contains the edge (p, c). The child table and the link between the parent and the child are then removed. Other links connected to the parent table remain unchanged.

Projection—Any subtree may be removed from the Match Diagram, such that the resulting Match Diagram describes a projection of the original tuples onto a subset of the attributes. The projection in the resulting Match Diagram will consist of those attributes in the resulting tables.

Reduction—The number of tuples in a Match Diagram can be computed. Furthermore, the computation can produce the number of tuples that are based upon each row in the root table. Recall that the tuples described by the Match Diagram are formed by concatenating the tuples contained in the root table with some combination of the tuples from the descendant tables. Thus, each row in the root table is the basis for forming at least one tuple. This transform computes the number of tuples derived from each row in the root table, and appends that count as an additional attribute value to row.

Special case #1: The reduction transformation may be applied to any subset of the tables and links in the Match Diagram such that selected tables and links form a tree. In other words, the computation of the number of tuples does not need to count every descendent of the root, and does not necessarily need to be applied to the root of the diagram.

Special case #2: The same transformation can be used with any operation on attribute values that is both commutative and associative (e.g., sum, product). Thus it is possible to compute the average value of some attribute over the tuples.

Note: Reduction is most useful when combined with projection. In this way it is possible to compute average values across a large set of tuples, and then compute a much smaller projection of the tuples and still retain the average.

An implementation may use a segment matching instruction set in which combinations of match-diagram transformations are implemented as a single operation. For example, the Link Promotion transformation and Link Lift transformation can be combined into a single operation. This combined operation would effectively perform the Link Lift transform, but would permit the transformation even when the preceding link is not fan-out-free. Similarly, Link Promotion can be implemented to promote multiple links at the same time such that the newly created table contains attributes from both the parent and child tables Returning to FIG. 6, during the static optimization process in step 106 (which is described in more detail with reference to FIG. 10B), the method attempts to find a sequence of instructions that will result in the smallest worst-case time complexity segment matching for a given pattern. The static optimization (or the optimized plan generated by the static optimization) is not specific to the characteristics of the input graph, but rather is selected based upon known properties of the instructions themselves and how they interact in sequence. An informal statement of the static optimization problem is to first minimize the number of transformations that must be performed, and then to ensure that as many of the expansion and reduction operations can be performed as possible after each transformation.

The static optimizer cannot predict the amount of actual expansion or reduction that takes place in the search space, nor does it know the node degree of the input graph. However, during the dynamic optimization process in step 108, a dynamic optimizer would take advantage of runtime information that characterizes the current size of the search space and properties of the input graph to further optimize the search plan. Simple forms of dynamic optimization can be based upon heuristics, such as, on average some specific node type may have relatively few matches, and so pattern nodes with that type should be selected early in the matching processes to reduce the overall size of the search space. More sophisticated dynamic optimizations may involve evaluating at run time the number of matches to each pattern node and the average node degree for each node type. This information could then guide the planner to selecting a sequence of match instructions much more efficient than would be possible without runtime information.

FIG. 10B illustrates more details of the static optimization of the planning method 100. The static optimization has the following steps: step 112 of creating and augmenting an adjacency matrix for the pattern graph (described in more detail below); step 114 in which the planner selects an ordering for the nodes in the pattern graph; step 116 in which, once the ordering of the nodes is determined, the planner may generate a lift/link sequence; and step 118 in which any views from the pattern are exported. When these steps are completed, the search pattern has been statically optimized and may be fed into the dynamic optimizer or provided to the segment matcher to perform the segment matching using the optimized search pattern.

Creating and Augmenting the Pattern Adjacency Matrix

The planner uses the adjacency matrix for the pattern graph to identify the pair-wise relationships/constraints that must be matched. A non-null entry at position (k, j) in the adjacency matrix means that there is some constraint between pattern node $P_k$ and $P_j$ that must be confirmed. Note that pair wise constraints are not limited only to edges. The following examples are some of the pair-wise constraints (but the invention is not limited to the particular pair-wise constraints listed here) that the planner may track using the augmented adjacency matrix:

1. Edges between pattern nodes (i.e., an explicit relationship);
2. Irreflexive relationships between two nodes (i.e., two pattern nodes that have identical or related types, but for which two distinct input nodes must be matched—in other words, there is an implied irreflexive relation between these two pattern nodes that states that we can only choose a pair of input nodes (x, y) provided that x≠y.)
3. A value is computed using a binary expression evaluated over the contents of these two nodes. For example, a pattern could contain two nodes of type "Person", and the pattern may specify that for every match that is found, the matcher needs to compute the average age of these two people. While not obviously a "constraint", the work required by the planner (links and lifts) to compute this value is almost identical to the work required to evaluate a constraint.

For every pair of nodes in the pattern, the planner inserts a non-null at the corresponding position in the adjacency matrix that encodes all of the constraints that apply to that pair. Note that there may be more than one constraint that exists, in which case the encoded value in the adjacency matrix will specify a list of the constraints. For this reason, the matrix may be known as the "augmented adjacency matrix" wherein the original adjacency matrix for the pattern graph is augmented by additional entries for computed values and other types of constraints.

Selecting a Node Ordering

The MatchDiagram will contain one VertexTable for every pattern node in the pattern. Each VertexTable is a table of all the possible choices for one pattern node wherein the table itself is bound to a specific pattern node (or node attribute, or Computed Value). The rows in the table correspond to choices (e.g., input nodes that match the pattern node). The columns in the table are the payload itself (e.g. the node ID of the input node), and links to descendant tables (subsequent choices in the decision diagram). A VertexTable contains all the choices for a single pattern node (we also use VertexTables to store attributes and computed values). If the pattern makes reference to node attributes, then those attributes are placed into their own VertexTable. Any values that are computed during matching will result in the creation of additional VertexTables. To the planner, each of these pattern elements is a node. In summary the following pattern elements can result in nodes:

1. Pattern nodes (the VertexTable will contain the node ID of matches from the input graph)
2. Attribute values (the VertexTable will contain the values, links will be used to record the association between the node and its attribute). This representation is similar to what results if one "internalizes" or "interns" an attribute type—each distinct value is represented one time only, and if that value appears multiple times, then each occurrence is encoded as a reference to the value.
3. Computed values, including any temporaries required for expression evaluation. For example, if a pattern contains instance nodes x, y and z, and makes a constraint that x.v1+y.v1<z.v2 then one temporary (at least) must be produced that will hold the computed value x.v1+y.v1.

Once the set of nodes has been identified, the nodes must be arranged into a selected optimal sequence. The selected optimal sequence involves static optimality (and a sequence is statically optimal if matching that sequence results in the fewest link/lift operations) and dynamic optimality wherein a sequence is dynamically optimal if matching that sequence results in the creating the fewest number of rows in the VertexTables. One factor that contributes to dynamic optimality is selecting nodes that will have the fewest possible matches, and placing these nodes at the beginning of the sequence.

A few general rules for selecting a node ordering are provided below in which D indicates the node degree and N is the number of nodes. In the formulae of the rules, N is limited to only those nodes selected as candidates (i.e., only the nodes in a single VertexTable). In addition, the number of edges is E=DN. For illustration purposes, constant node degree is assumed (i.e., every node has the same number of neighbors.) Those rules may include:

- Link operations are generally faster than lift. A link operation has time complexity linear in the number of edges, i.e., O(DN). A lift operation may require promotion of the link between the "grandparent" node and the "parent" node. As a consequence, the newly introduced grandparent node will have O(ND) rows (instead of the O(N) it had originally), and there will be $O(D^2N)$ edges between the newly created grandparent and the original child. The time complexity for lift, including the promotion, is $O(D^2N)$.
- The cost of performing a lift operation is linear in the number of aunts/uncles. Since the grandparent is expanded, links between the grandparent and the original k children of the grandparent will need to be updated (they are also expanded). Each of the new links will contain $O(D^2N)$ edges and will take $O(D^2N)$ time to construct. Thus, the total time to perform a lift is $O(kD^2N)$ where k is the number of children of the grandparent.
- The time/space complexity of link is not affected by the number of children. A node can be linked into the tree either as a leaf of the tree or as the new root of the tree. When linking a node as the new root of the tree, it must be linked to the previous root.
- The tree can be re-rooted by simply re-sorting the links along the path between the node that is to become the new root and the original root. The time for re-sorting is linear in the number of edges in each link that is to be re-sorted. This cost is relevant because when considering how best to add a node Y to the match diagram, where Y is to become the root and must be linked to some existing node X, the planner must decide whether to re-root a tree so that node X is the root (and then link X as a child of Y), or to link Y to the current root of the tree and then lift node X until it is a child of Y.
- Repeated lift operations will sometimes result in compounding the time complexity. For example, if the same child node is lifted k times, then each lift operation may cost a factor of O(D) more time and may create a table with O(D) more rows. The largest vertex table will thus have $O(D^kN)$ rows and there will be $O(D^{(k+1)}N)$ edges to the child, requiring a total time complexity of $O(D^{(k+1)}N)$. Note the following (common) special cases.
- If two siblings are lifted, the time and space does not compound. The time to lift k siblings (each sibling is lifted one time) is $O(kD^2N)$.
- If two cousins are lifted (two nodes who's parents are siblings), then the time and space does compound. The time to lift k cousins, no two of which are siblings, is $O(D^{(k+1)}N)$ The current version of the planner attempts to arrange nodes in an order that forms a Hamiltonian path of the augmented pattern graph. The basis for this approach is that we want as many "link" operations as possible. The maximum number of such operations is P−1 (for P nodes), and can be obtained only if there is a Hamiltonian path in the pattern. If the nodes are arranged in the order of this Hamiltonian path, then by using a link operation for each consecutive pair of nodes in the sequence, we'll maximize the number of links. Any relation not covered by the Hamiltonian path will have to be addressed with (one or more) lift operations.

Generating a Link/Lift Sequence

A link( ) operation has (at least) two arguments which are a parent VertexTable and a child VertexTable. The child table must not currently be linked to any other parent (recall that VertexTables are organized as a tree, hence each node has at most one parent). The parent VertexTable is updated by creating a Link to the child table. Typically, the link( ) operation will be passed an edge list, and the newly constructed Link will connect rows in the parent to rows in the child if and only if the corresponding pair of node IDs is present in the edge list. The time complexity of link( ) is O(E log N) where E is the size of the edge list passed to the function and N is the number of rows in the child VertexTable. A link( ) is usually performed because the parent VertexTable contains the set of matches for a particular pattern node A, the child VertexTable contains the set of matches for a particular pattern node B, and the pattern contains an edge between A and B. In this case, the link( ) method is passed the collection of all edges between A and B. After the link( ) operation completes, the MatchDiagram represents matches to the edges between A and B.

A lift( ) operation has one argument, but affects three nodes. The argument to lift( ) is the "child" node which will be disconnected from its parent, and reconnected to its "grandparent" (the parent of its parent). If the grandparent does not exist (i.e., if the child's parent is the root of the tree), then the child will be made the root, and the parent will be made into a child of the child. Otherwise, the child will become a sibling of its parent. Lift( ) can be performed with no constraints, in which case the set of matches represented by the MatchDiagram is unaffected by the operation. Note that prior to the lift( ) the selection of a row in the child table was dependent upon which row in the parent had been selected and that after the lift( ) the child row can be selected independently of the parent. To make this change, it is usually necessary to increase the size of the grandparent table (by a factor of D). The time complexity of lift( ) is O(ED log E) where E is the number of edges in the Links between the affected nodes, and D is the fan-out (i.e., the "node degree") in the links. In general, D<<E.

Once the node sequence has been established, the creating a sequence of link/lift operations is fairly routine. The planner rearranges the adjacency matrix to reflect the sequence, i.e., the first node in the sequence is assigned the first row in the matrix, the second node in the sequence gets the second row and so on. The planner will ignore everything on or below the primary diagonal of the adjacency matrix. Note that the primary diagonal (positions (k, k) in the matrix) describe the relations between a node and itself. Any constraints involving only one node are handled at the storage layer (by an appropriate DB select statement) and do not require any activity by the planner. The rest of the matrix is symmetric and entry (j, k) is the same as (k, j).

The planner proceeds through the upper right triangle of the adjacency matrix from bottom-to-top and from left-to right. An exemplary implementation is as follows:

For each row k (from largest value of k down to zero):
1. Create a VertexTable for the node corresponding to row k. This table can be constructed with the MatchDiagram.addMatches( ) method. The source of the matches is ultimately the result of a DB query.
2. Let j be the first non-null entry in row k of the adjacency matrix where j>k. If the node for column j is not currently the root of the MatchDiagram, re-root the diagram so that j becomes the root. Then link node k and node j according to the constraints listed in the adjacency matrix for this pair.
3. For each additional non-null entry (k, m) in row k of the matrix, if node m is a descendant of node j, issue lift operations until m is a child of k. The last lift operation should contain the constraints listed in the adjacency matrix at the (k, m) entry. If node m is not a descendant of node j, then re-root the MatchDiagram fragment containing m and link k to m with the required constraints.

Note that after step 3, node k is a root in the MatchDiagram, and all constraints have been reconciled between node k and any other node j where j>k. Note that, if the adjacency matrix is sufficiently sparse, it is possible that the Match-Diagram will be disconnected (i.e., it is a forest).

Note that as the planner is issuing link/lift commands, it must predict what shape the MatchDiagram will have as a result of the links/lifts thus far. It is sufficient to record which node is the parent for each node.

Note also that the set of candidates for each node can be reduced by issuing DB queries based on the edges. Thus, the planner should lazily produce VertexTables such that the table is not actually created until it is linked into the diagram.

FIGS. 11A-D illustrate an example of a segment matching method used by the search system of FIG. 6. Prior to describing the detailed steps of the segment matching method, the benefits and goals of the segment matching method is described. Segment matching is a pattern matching framework for searching large graphs and segment matching can be used to find subgraphs within a large graph such that each subgraph is isomorphic to some given pattern graph (i.e., the subgraph isomorphism problem). Segment Matching can be used for other purposes too, including related graph-pattern matching tasks that are not quite subgraph isomorphism (e.g., finding matches to patterns where graph nodes are allowed to be repeated (the same input node matched to two or more pattern nodes, for example), or finding matches to patterns where a set of input nodes are matched to a single pattern node (so-called "cardinality" patterns)). The segment matching uses data structures to implement the method including a top-level data structure which is the MatchDiagram. The MatchDiagram uses one or more VertexTables and Link data structures to represent the matches discovered so far. As operations are performed, the VertexTables and Links are modified. For example, the lift operation breaks the Link joining a VertexTable and its parent, and creates a new Link joining the original child VertexTable to its grandparent.

Segment Matching is based on matching and tracking pairwise relationships (i.e., dyads). During the matching process, Links in the MatchDiagram may represent actual relationships from the database, or may represent inferred or artificial relationships that have been discovered during matching. Each Link is directed, but the direction of the Link does not necessarily correspond to the direction of the relationship from the database. Hence, Segment Matching is a matching process based on the undirected edges (i.e., segments) in the pattern graph.

Returning to FIG. 11A, the segment matching method 120 includes a step 122 in which the constraints for the isomorphic matches are encoded using path algebra to develop primitives for concatenation, and reversal (i.e., computing the inverse of a directed path), intersection and union. For the example above, we add to our isomorphs an edge T that satisfies the expression:

$$T = AC\_edge \cap AB\_edge \oplus BC\_edge$$

where any "$\alpha\beta\_edge$" is the set of edges directly connecting matches for node $\alpha$ to matches for node $\beta$ and the operator $\cap$ is set intersection, and the operator $\oplus$ represents path concatenation. Using this path algebra it is possible to encode symbolically all of the constraints that must be satisfied for isomorphic matches. This capability holds promise in two areas. First, the search engine may be able to utilize this symbolic representation to lazily compute the set of isomorphs, thereby permitting greater control of the size of the search space during processing. Second, the set of expressions may be statically reduced in advance of matching. This capability is especially worthwhile for applications where the entire subgraph is not required. For example, a search might be specified in practice as, "find all assassins involved in murder-for-hire patterns". The search pattern might include several pattern nodes (an assassin, a victim, a conspirator, a weapon, etc.) yet only matches to one of these pattern nodes will ultimately be examined. Since the identity of the assassin is revealed only by their connections to the conspirator and the victim, the full pattern must be searched in some capacity. By pre-processing the path expressions, the potential exists to minimize the time and space required to perform this matching while still preserving the correct set of results. In step 124, the search engine determines matches for the search pattern using the path algebra described above. The details of the match determining is described below in more detail with reference to FIGS. 11B —11D. In step 126, the segment matching process outputs the match diagram.

For example, the search system with the segment matching may be used to discover instances of suspicious activity with a large body of observed events that are stored in a relational database wherein the observed events can be represented as a set of input graphs. An analyst may then want to perform a search of the observed events, and, using the search system, may input the search request into the planner that generates the optimized search plan. Then, the segment matcher matches the optimized search plan against the graph representations of the observed events in order to generate a list of matches. The analyst may then review the matches and take any necessary action.

Figures 11A, 11B:
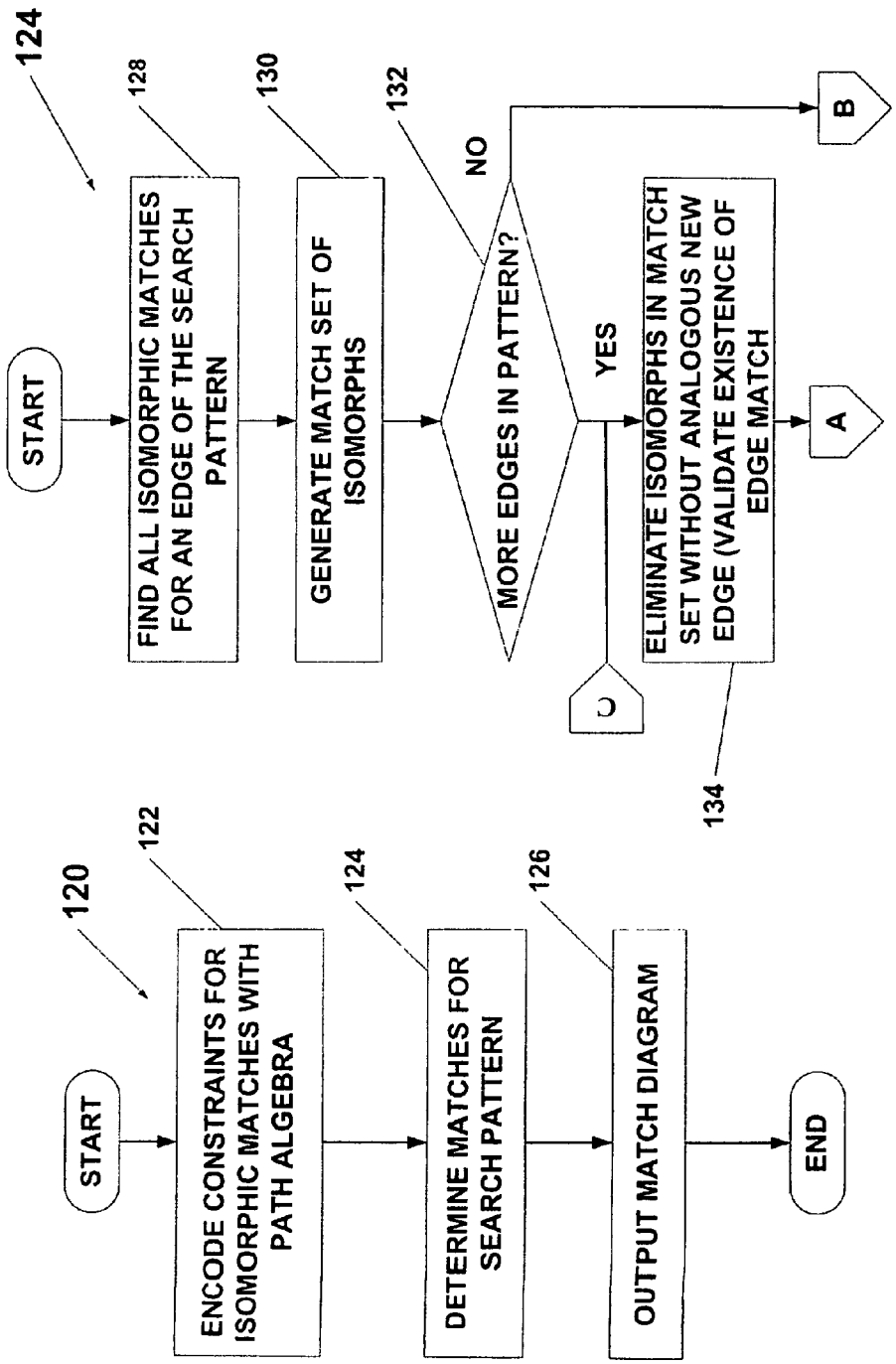
FIGS. 11A-D illustrate an example of a segment matching method used by the search system of FIG. 6.

FIG. 11B illustrates more details of the match determining step 124. In step 128, the segment matching process finds all isomorphic matches for an edge of the search pattern. In step 130, the segment matcher generates a match set of isomorphs for the particular edge. In step 132, the segment matching process determines if there are more edges in the search pattern to match. If there are not any more edges, then in step 138, the segment matcher generates a final match diagram that shows the matches between the search pattern and the input graph(s). If there are more edges in the search pattern, then in step 134, the segment matcher, using the new edge being matched, eliminates isomorphs in the match set that do not have an edge that is analogous to the new edge being matched. This may also be the validation of the existence of an edge match. This results in a match set with a set of isomorphs that meet the edge criteria for the edges matched. In step 136, (shown in FIG. 11C), the segment matcher determines if there are more edges in the search patterns and loops back to step 134 if there are more edges or goes onto step to 138 to produce the final match diagram if there are not more edges to be matched. Using this process, each edge of the search pattern is matched against the input graph(s).

Figure 12:
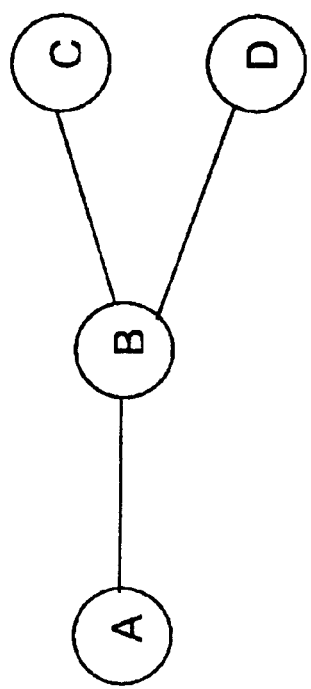
FIG. 12 is an example of a simple search pattern that may be input into the segment matching system.

FIG. 12 is an example of a simple search pattern 150 that may be input into the segment matching system wherein the segment matching is graph construction wherein the graph has the same topology (# nodes, # edges and connections) as the pattern graph. Each vertex in the graph is a table and each row in the table has a pointer (in some cases more than one pointer) to a row in another table. The pointers represent matched edges. So, for example, if there is a node t that matches pattern node a, and a nodes s that matches pattern node b, then an edge between t and s that matches an edge between a and b is represented with a pointer from the row containing t to the row containing s.

Figure 13:
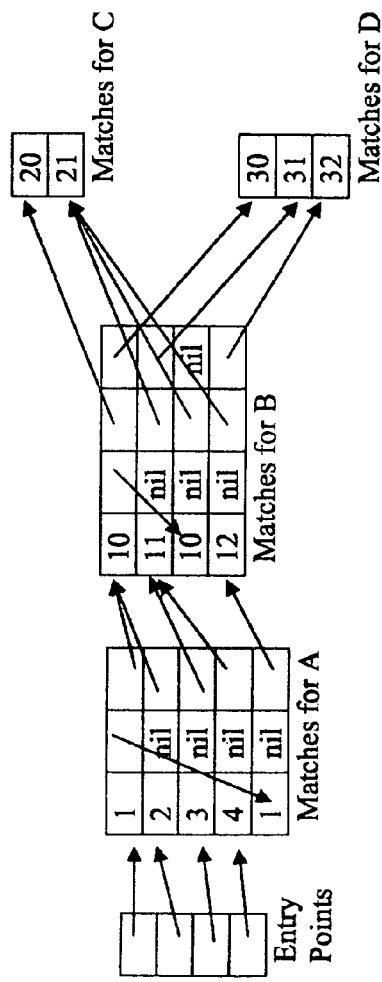
FIG. 13 is an example of a match diagram that is generated by the segment matching system for the search pattern shown in FIG. 12.

The sample search pattern 150 shown in FIG. 12 has four nodes (A, B, C and D) and three edges (an edge between A and B, an edge between B and C and an edge between B and D) wherein the edges are undirected in this example although the segment matching can be used with either directed or undirected edges. Since there are four nodes in the pattern, the segment matching process will produce a graph with four vertex tables. The vertex table corresponding to node A will have three columns, the vertex table for node B will have four columns and the vertex tables for nodes C and D will each have one column as shown in FIG. 13. In each vertex table, the first column contains node IDs for input nodes that match the corresponding pattern node and the second column is used to create (singly) linked lists of rows in the table described in more detail below. Any remaining columns in a vertex table contain pointers to rows in other vertex tables (shown as arrows in FIG. 13). Note that all of the pointers in the same column will point to rows in the same table. An arbitrary pattern node is identified as the "root" of the pattern. A vector of pointers will contain one pointer for each "entry point" into the vertex table for the root pattern node.

FIG. 13 is an example of a match diagram 160 that is generated by the segment matching system for the search pattern shown in FIG. 12. In this example, the pattern node is the vertex table for node A. For this example of the match diagram, an input graph with 40 nodes (numbered 0 . . . 39) such that pattern node A matches all input nodes with IDs 0 . . . 9, pattern node B matches input nodes with IDs 10 . . . 19, pattern node C matches input nodes with IDs 20 . . . 29 and pattern node D matches input nodes with IDs 30 . . . 39 is assumed and the edges for this graph must include at least the following set of edges {(1,10), (1,12), (2, 10), (3, 11), (4, 11), (10, 20), (10, 21), (10, 30), (11, 21), (11, 31), (12, 21), (21, 32)}. A "match" for the pattern is described by a path through the match diagram. Note that node 1 (in the vertex table for node A) has two outgoing edges matching pattern edge (A, B). Hence, node 1 appears twice in vertex table A, with a link 162 ($2^{nd}$ column) joining the "repeated" rows. Starting from each of the four entry points and following a path yields the following seven matches, each match is of the form a . . . b . . . c . . . d where a is the input node matching pattern node A, b is the input node matching pattern node B and so on: 1 . . . 10 . . . 20 . . . 30, 1 . . . 10 . . . 21 . . . 30, 1 . . . 12 . . . 21 . . . 32, 2 . . . 10 . . . 20 . . . 30, 2 . . . 10 . . . 21 . . . 30, 3 . . . 11 . . . 21 . . . 31, and 4 . . . 11 . . . 21 . . . 31.

The match diagram is traversed by recognizing that one node must be selected from each table. The inter-table pointers indicate which row to use when selecting the next node for a match. When two or more rows are joined into a linked list within a single table (e.g., node 1 in vertex table A has two rows, and node 10 in vertex table B also has two rows) then each row must be used. Specifically, the matches represented by the diagram are the Cartesian product of the linked rows joined by inter-table pointers. For example, node 1 appears in two linked rows in table A, so we must take the Cartesian product of these two rows with the remainder of the match diagram yielding {1, 10 . . . } and {1, 12, . . . }. More specifically, since edges join node 1 to both nodes 10 and 12, then a match can be found by using node 1 and then node 10, as well as using node 1 and then node 12. If pattern node A is matched to node 1, and pattern node B is matched to node 10, then we once again have two choices for pattern node C (nodes 20 and 21 are both adjacent to node 10). This choice is reflected in the match diagram by linking two rows for node 10 in vertex table B. Hence, the three paths beginning from the first entry point are 1 . . . 10 . . . 20 . . . 30, 1 . . . 10 . . . 21 . . . 30, and 1 . . . 12 . . . 21 . . . 32.

Figure 14:
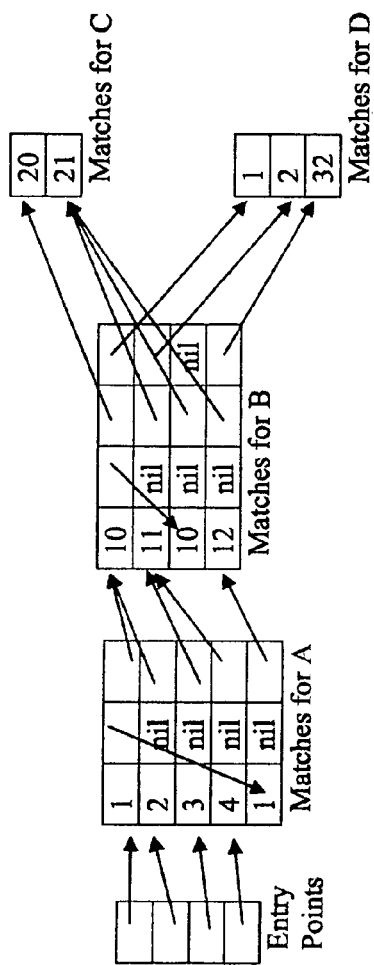
FIG. 14 is an example of a match diagram generated by the segment matching system wherein the match diagram has illegal match elements.

The process of segment matching is to construct a match diagram that represents the set of matches to a specific search pattern graph. In some cases, elements in the match set (which is the set of matches described by the set of all paths through a match diagram) will be invalid because a single input node will be repeated two or more times in the same match. FIG. 14 is an example of a match diagram 170 generated by the segment matching system wherein the match diagram has illegal match elements since all references to node 30 are replaced with node 1—that is, assume that node 1 matches both pattern node A and pattern node D, and that the edge (10, 30), is replaced with the edge (10, 1). The resulting match diagram is shown in FIG. 14. Note that the seven paths through this diagram are 1 . . . 10 . . . 20 . . . 1, 1 . . . 10 . . . 21 . . . 1, 1 . . . 12 . . . 21 . . . 32, 2 . . . 10 . . . 20 . . . 1, 2 . . . 10 . . . 21 . . . 1, 3 . . . 11 . . . 21 . . . 2, and 4 . . . 11 . . . 21 . . . 2. Of these paths, the following five are legal matches: 1 . . . 12 . . . 21 . . . 32, 2 . . . 10 . . . 20 . . . 1, 2 . . . 10 . . . 21 . . . 1, 3 . . . 11 . . . 21 . . . 2, and 4 . . . 11 . . . 21 . . . 2.

The segment matching process also handles the repeated node problem which is the reduction of the match diagram to eliminate paths on which a node is repeated two or more times. This problem exists, but it can be resolved for several reasons. First, many practical patterns have disjoint attributes on most/all pattern nodes. If just two pattern nodes have overlapping "candidate sets", then the match diagram can be constructed to ensure that there is no "fan in" from the vertex tables corresponding to these two nodes. For example, if node 1 and node 2 are both matches for pattern node A, and both are adjacent to node 10 (a match for pattern node B), then an ordinary match diagram would use one row for node 10 in vertex table B, and have both the rows in vertex table A from node 1 and node 2 point to this single row (i.e., a "fan in"). If it is known a priori that pattern node A overlaps with another pattern node, then the match diagram should be forced to maintain two rows in vertex table B. In this way, each arc throughout the match diagram can be reached by only a single row from vertex table A. As the match table is constructed, each row can be associated with a forbidden set (rows reachable from node 1 will have node 1 in their forbidden sets, nodes reachable from node 2 will have node 2 in their forbidden sets). When an edge suggests linking a row to a node in its forbidden set, the link is not made. If the row becomes "dead" (i.e., it cannot be linked to the next vertex table), then the row is eliminated.

This approach will result in increasing the size of the match diagram. In the worst case, the match diagram can become exponentially large. However, the circumstances necessary for this to occur (a large number of vertex tables with high fan-in coming from a pattern node that overlaps one or more other pattern nodes) seems relatively unlikely. The actual exponential term in the space complexity is $O(F^P)$ where F is the fan-in (limited by node degree) and P is the number of pattern nodes with overlapping candidate sets. In many cases, we can expect P to be around 2 or 3, and F to be around 5-10.

Figure 11D:
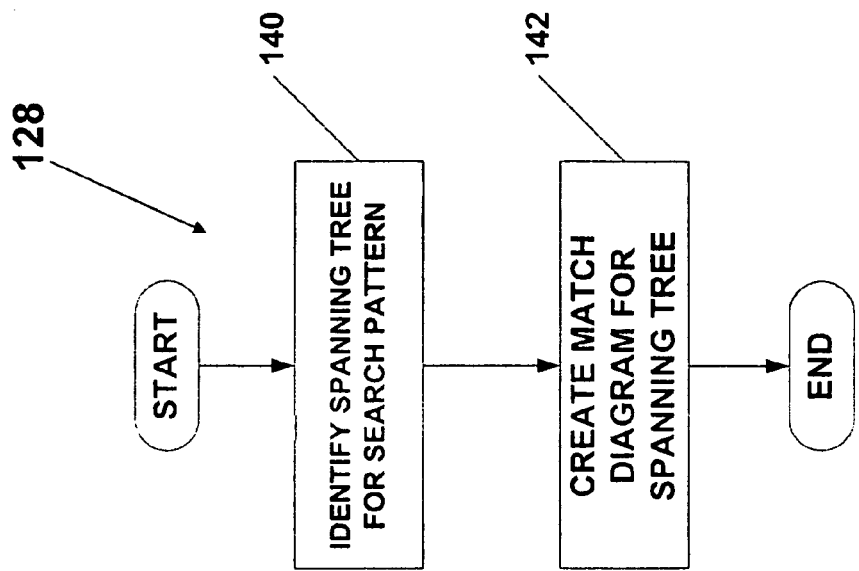
Figure 11C:
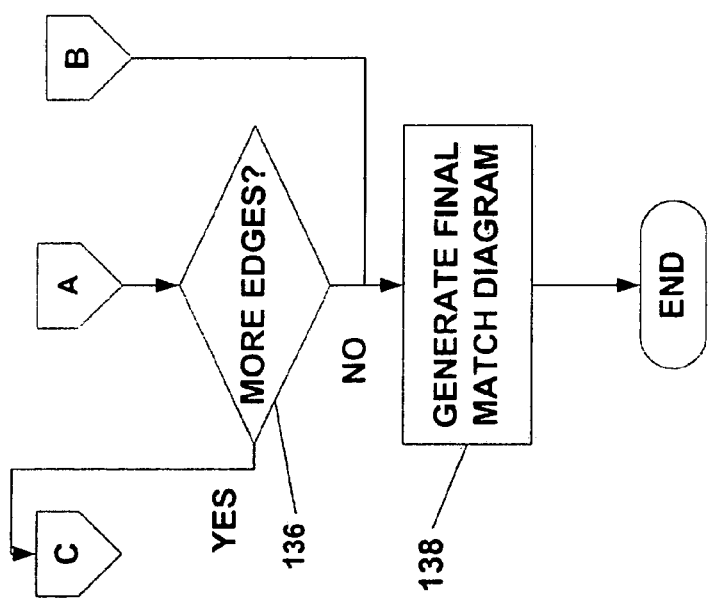

FIG. 11D illustrates more details of the isomorphic matching step 128 of the segment match process. In step 140, the segment matcher first identifies the spanning tree for the search pattern where the root of the spanning tree will be the entry point for the match diagram. In step 142, the process creates a match diagram for the spanning tree. The segment matching process, as described above in FIGS. 11B and 11C, then matches each edge of the search pattern (validate the existence of that edge in the match diagram) that consists of eliminating rows from the match diagram to reduce the original match set. Once all pattern edges have been validated, the resulting match set is the correct match set for the pattern as shown in step 138 in FIG. 11C. Now, each of the sub-steps is described in more detail.

Identify Spanning Trees

Some of the issues that are impacted by the selection of the spanning tree are:

The root of the spanning tree will be the first vertex table that is created. The number of neighbors of this table places a bound on the number of rows in the next table. So, by choosing a root that is "hard to match" (the attributes on the pattern node match few input nodes) we can reduce the total size of the match diagram (i.e., not just the first vertex table). This can have a significant impact on execution time.

For "inexact matching" we may want to choose spanning trees that include only "required" nodes and edges from the pattern. Or, we may want to choose multiple spanning trees and perform a different search for each spanning tree.

Note that the direction of edges in the pattern does not need to be the same as the direction of the same edge in the spanning tree. For example, if pattern node A is selected as the root of the spanning tree, and pattern node B is connected to A with a directed edge from B→A, then we can still make B a descendent of A in the spanning tree. More generally, the links in the match diagram will correspond to edges in the pattern, however, the direction of the original edge need not correspond (in any way) to the direction of the link.

In the match diagram, the path through the diagram will describe a collection of nodes. In other words, a path through the diagram should visit each vertex table one time. Since a path selects a specific row in the vertex table, and since each row in the vertex table is labeled with an input node ID, a path through the match diagram selects one input node for each vertex table. To ensure that all of the pattern nodes are matched, the process needs one vertex table for each pattern node. Other than that requirement, the match diagram can take any form. Specifically, the links between vertex tables do not need to have any relationship to edges in the pattern graph. For example, one can construct a simple linear diagram that essentially said, "choose a node that matches pattern node A" (by selecting a row in vertex table A), "then choose a node that matches pattern node B (by traversing a link to the next vertex table)", "then choose a node that matches C" and so on. This diagram would still describe matches to the pattern, even if A and B are not actually connected in the pattern.

The simplest match diagram is a linear diagram in which row i in vertex table A is linked to row i in vertex table B, and so on. A path through this match diagram will traverse only row in each of the vertex tables (there is no fan-in or fan-out from any row). Obviously, this diagram is equivalent to constructing a set of vectors, each vector constructed by concatenating row i from each of the vertex tables for some i. Each vector represents one match.

While it is true that the arrangement of vertex tables and links can take an arbitrary form without limiting the ability of the match diagram to represent matches, some arrangements will be exponentially smaller than others. The compactness of the match diagram representation relies on fan-in on the links (e.g., two or more rows in vertex table A linked to the same row in vertex table B). Fan-in is easy to generate when two or more distinct nodes (two or more rows in vertex table A) are neighbors of the same node (one row in vertex table B). For example, if both nodes 1 and 2 match pattern node A, and both nodes 1 and 2 are adjacent to node 10, where 10 matches pattern node B (and A and B are adjacent in the pattern), then a more compact representation can be constructed by using A as the root of the match diagram with links going from A to B, than a diagram that uses B as the root with links going from B to A. The former diagram requires two rows in vertex table A and only one row in vertex table B, while the latter case requires two rows in each of the two vertex tables. Note that the direction of the edge between pattern node A and pattern node B is irrelevant.

Creating the Match Diagram for the Spanning Tree

Now, the generation of the match diagram for the spanning tree (step 142 in FIG. 11D) is described in more detail. Initially, the match diagram consists of a vector of entry points (See FIGS. 13 and 14 for example.) The vector of entry points has zero elements, and there are no vertex tables. Matching a spanning tree consists of traversing the spanning tree (in an arbitrary order). As each node is visited in the spanning tree, a new vertex table is created for the new node. The rows in the new vertex table are populated with all input nodes that a) satisfy the node constraints (i.e., have the required node attributes) for the pattern node, and b) are adjacent to at least one node contained in the vertex table for the previous node in the spanning tree. Once the rows have been created in the new vertex table, links are added between the parent vertex table and the new table. This process is then repeated with the next pattern node, and so on until all pattern nodes have been visited.

The creation of a vertex table for the root of the spanning tree is only slightly different than creating any other vertex table-nodes selected for rows in the root vertex table do not need to be adjacent to any other node (more on this later), and the root vertex table is not linked to another vertex table, but instead is linked to the vector of entry points. The process for creating the vertex table for the spanning-tree root is as follows:

1. Select all nodes matching the root pattern node.
2. Sort the nodes by node ID and use the nodes to populate a vertex table. The number of columns in the vertex table is determined by the degree (i.e., number of edges) of the root pattern node. One column is used for the node ID. One column is used for an intra-table pointer (to provide for "fan out") and one column is used for each edge connected to the root pattern node. The edge columns contain inter-table pointers. Initialize all pointers to nil, and populate the node ID column with the node IDs returned by the select.
3. Allocate a new entry-point vector with as many entry points as there are rows in the root vertex table. Point each element in the vector to one of the rows in the root vertex table. NOTE: The number of entry points will not increase beyond this size (it may decrease) and these pointers should not need to change. The number of rows in the root vertex table may change (more rows may be added to create all the necessary links).

Figure 15:
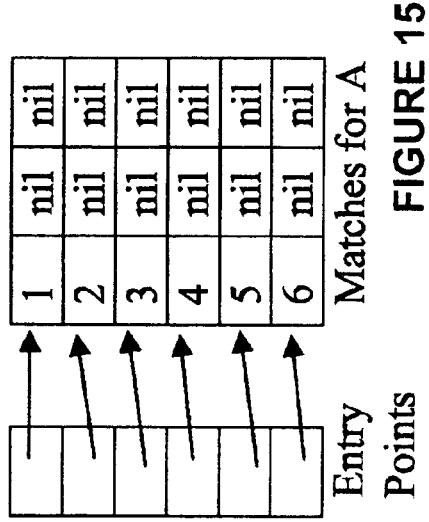
FIG. 15 is an example of a root vertex table.

FIG. 15 shows a root vertex table 180 for the match diagram shown in FIG. 13. For brevity, only nodes 1-6 are shown (the example from FIG. 13 assumed that nodes 0-9 matched pattern node A). The rows for nodes 5 and 6 will ultimately be deleted since there are no edges emanating from these nodes. When the rows for 5 and 6 are deleted, the corresponding entry points will also be deleted. Once the root vertex table has been created, the edges in the spanning tree must be traversed. Either a depth-first or breadth-first traversal may be used. Assuming that the edge selected connects pattern node A to pattern node B, the following steps must be followed to create (new) vertex table B.

1. Create a vertex table for pattern node B using steps 1 and 2 as before; and
2. Link vertex table B to the match diagram as follows.
   A. Find all edges (a, b) such that a is one of the nodes in vertex table A, and b satisfies the node constraints for pattern node B.
   B. Sort the edge list lexicographically by a,b (i.e., use a as the primary sorting key and b as a secondary key).
   C. Scan the sorted vertex table for A and the edge list in tandem.
      i. If a row is found in the vertex table for which there is no edge, then mark the row for deletion. Rows can be marked by deletion by replacing the node ID with a special value top. When the table is sorted, top should be larger than all other values, and the deleted rows will be moved to the end of the vertex table. Note that since both the edge list and the vertex table are sorted, this scan can be done in Θ(M+N) time, where M is the number of rows in the vertex table and N is the number of edges.
      ii. If the row and edge have the same node ID for node a, then install a pointer inside the row to the vertex table row corresponding to b. Since the vertex table for pattern node B has been sorted, the row corresponding to b can be found in Θ(log M) time. Hence, this component of the scan can be performed in Θ(M log M+N) time.
      iii. As a special variation on case ii, if two or more edges have the same value for a (i.e., if an input node has node degree>1), then new rows must be added to the vertex table (each row in the vertex table can contain at most one link to the next table). The new rows should be added to the end of the vertex table (which can be done in amortized O(1) time) and linked via the intra-table link to the set of rows representing node a. NOTE: the additional work required for this extension adds only O(1) time to case ii.

The total time for this step is O(M log M+N). The proper choice of the spanning tree for the pattern can significantly reduce the values of M (the number of rows in the largest vertex table) and N (the maximum number of edges linking a previously matched input node to some other input node that matches one of the pattern nodes). Once the new vertex table has been created, the previous vertex table can be (optionally) sorted so that deleted rows can be recycled. If a deleted row is recycled, then it is necessary to (in Θ(M) time) traverse the set of links pointing into this vertex table and reset any pointers that point to deleted rows to nil. If the deleted rows are not recycled, then the pointer reset can be postponed until the match diagram is completed.

Figure 16:
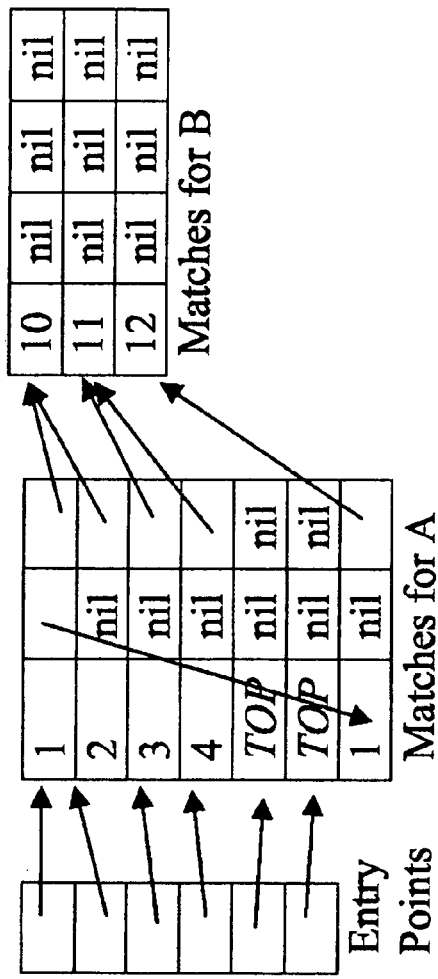
FIG. 16 is an example of the match diagram with a root vertex table with one descendant added.

FIG. 16 is an example of a root vertex table 190 with one descendant added which is the match diagram after the vertex table for pattern node B is created. Note that since nodes 13,14 . . . are not reachable from the nodes contained in vertex table A, no rows are required for these nodes. These rows can be either allocated and then removed when it is discovered that no links lead to these rows, or the creation of vertex table B can be performed only after the edge list is created—thereby allowing the algorithm to allocate rows only for those input nodes that are both matches for B and reachable from some node that matches A. Note also that FIG. 16 shows the two deleted row corresponding to nodes 5 and 6 in vertex table A, and the one added row added that allows representation of the fan-out from node 1 to both node 10 and node 12.

Figure 17:
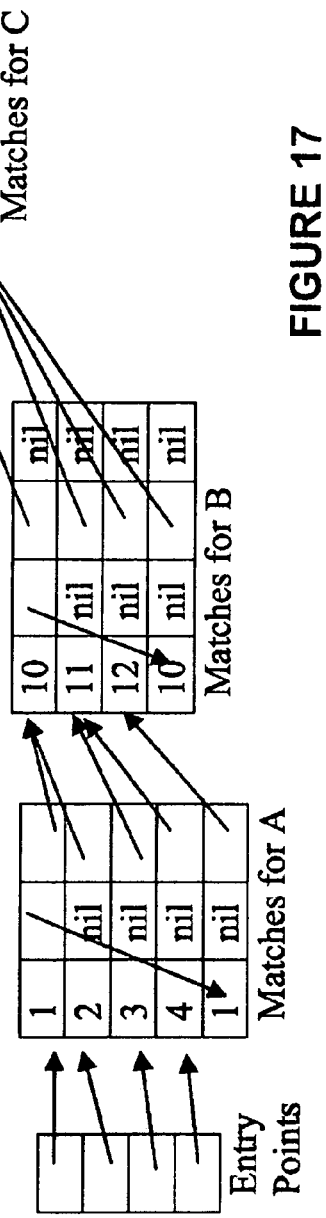
FIG. 17 is an examples of a match diagram generated by the segment matching system wherein the match diagram has three vertex tables.

The example from FIG. 13 would continue to be constructed by adding a vertex table for node C. The state of the diagram after this table is added is shown in FIG. 17. The unused rows from vertex table A have been deleted in this figure, along with the two dead entry points. Note that since there are no edges in the spanning tree emanating from C, only one column is required for this vertex table.

Figure 18:
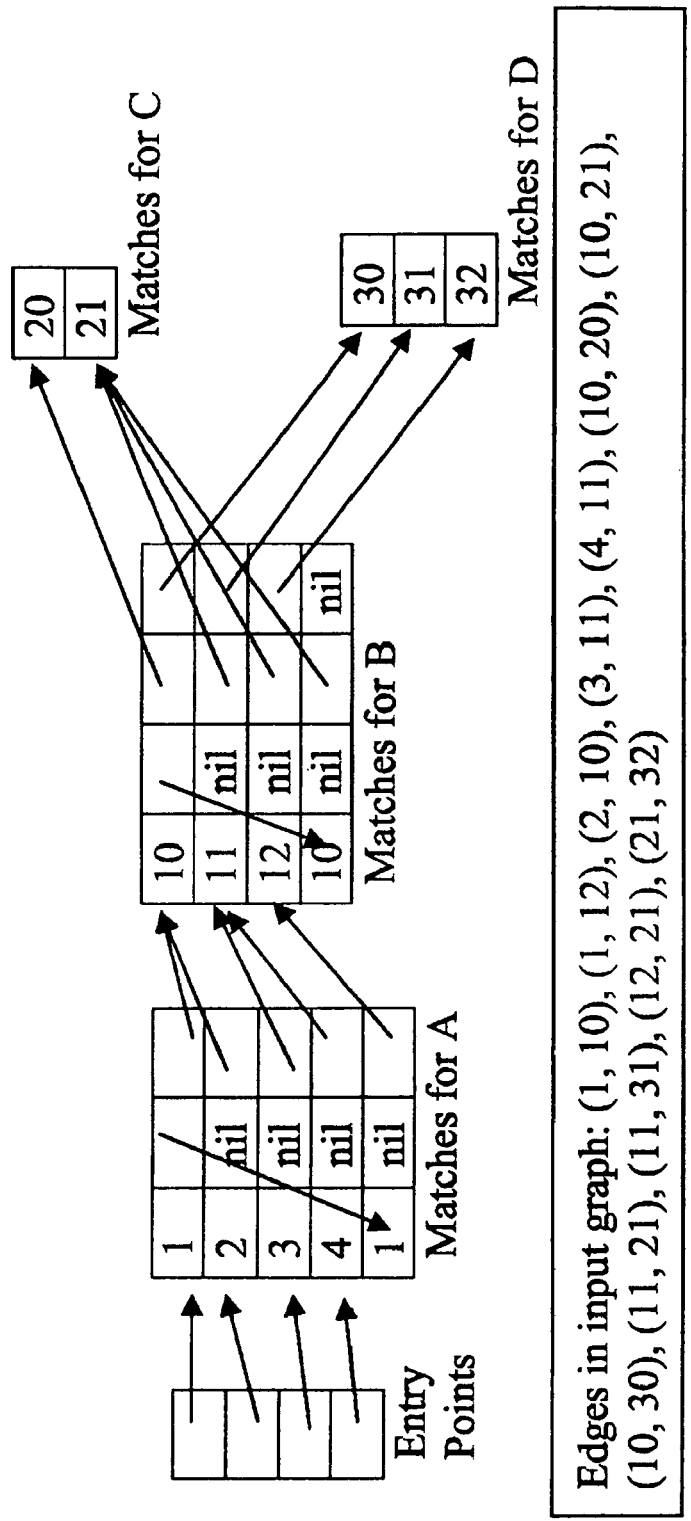
FIG. 18 is an example of a match diagram generated by the segment matching system from the spanning tree shown in FIG. 12.

FIG. 18 is an example of a match diagram generated by the segment matching system from the spanning tree shown in FIG. 12. The final step to construct the match diagram shown in FIG. 13 is to match the edge from B to D. This step can be done in precisely the same manner as any other spanning-tree edge. Note, however, that new rows will need to be added to the existing vertex table only if the number of edges (b, d) exceeds the number of edges (b, c) for some fixed b. In other words, if node 10 has a fan-out of two (as shown in FIG. 6) because of edges between matches for B and matches for C, then the first two edges (10, d) for any node d that matches D can be stored in the existing rows of the table. The third and all subsequent edges will require additional rows to be added as shown in FIG. 18. In FIG. 13, there is no fan-out between matches to node B and matches to node D. Note that the final row in the vertex table for node B (the second row for node 10) does not use the second inter-table pointer (node 10 is connected only to one node that matches D). The edge list is also shown in FIG. 18.

The total time for creating the match diagram from a spanning tree is O(PM log M), where P is the number of spanning tree nodes, and M is the size of the largest vertex table. Note that the only conservative bound for M is O(E) where E is the number of edges in the input graph. However, in practice, M is likely to be a small fraction of the number of nodes in the input graph.

Validating Pattern Edges not Contained in the Spanning Tree

The final step in constructing a match diagram for an arbitrary pattern graph is to eliminate row in the vertex tables by validating the remaining edges from the pattern. To illustrate how this step can be performed, assume that we add an edge to pattern shown in FIG. 12 between pattern nodes C and D. Assume that the input graph contains edges (20, 30) and (21, 32). Validating these edges should result in removing row 31 from vertex table D, which in turn should remove row 11 from vertex table B, which in turn removes rows 3 and 4 from vertex table A (eliminating two entry points from the match diagram). Performing this sequence is relatively straightforward, as node 31 is clearly no longer a legitimate match for pattern node D.

However, more complicated problems can occur when validating edges. Consider the effect on the match diagram if the only edge connecting a match for C to a match for D is the edge (20, 31). If this were the only edge, then rows 30 and 32 clearly should be deleted from vertex table D. Similarly, row 21 should be deleted from vertex table C. Once the deleted rows have been removed from these tables, vertex table B must be updated to remove any rows that link to deleted rows. Note that row 11 will be deleted from vertex table B. Once this row is deleted, row 31 can be deleted from vertex table D. This last deletion makes vertex table D empty, with the ultimate consequence of deleting the entire match diagram (which is the correct action, since with (20, 31) as the only edge between nodes matching C and nodes matching D, there are no matches to the desired pattern).

The segment matching process described above is faster to search large data sets. In particular, the number of paths through a MatchDiagram (and hence the number of matches represented) can be as large as $O(ND^{P-1})$ where N is the number of rows in a VertexTable, D is node degree (i.e., the number of DAG edges leaving each row in a VertexTable) and P is the number of nodes in the pattern. The size of the MatchDiagram, however, is $O(ND(P-1))$ (assuming P>1, and O(N) otherwise). If the number of pattern nodes is even modestly large (e.g., ten pattern nodes) and/or the node degree is large, the difference between $D^{(P-1)}$ and $D(P-1)$ is enormous. Thus, the MatchDiagram segment matching process can solve, in some cases, the decision problem for SGISO in polynomial time. The process also permits the number of matches to be determined in polynomial time even if the number of matches is exponentially large. Displaying all the results takes longer, since there can be an exponentially large number of results contained in the diagram.

However, for certain patterns, the segment matching process may be unable to determine the number of matches or solve the problem. In particular, a Match Diagram constructed using only the link( ) operation will have O(N) rows in each VertexTable and O(ND) edges in each Link wherein N is the number of nodes in the input graph and D is the node degree of the input graph. However, each lift operation increases the size of one of the VertexTables by a factor of D. The worst-case SGISO Match Plan requires $O(P^2)$ lift operations distributed over the P VertexTables. After doing that many lifts, each table will have expanded (by a factor of D) P-times over, and the final size will be $O(ND^{P-1})$. So, for some pathologically bad patterns and corresponding pathological input graphs, the final MatchDiagram size will be an exponential. Thus, for some patterns we cannot even construct the MatchDiagram in polynomial time, hence we cannot answer the class NP-Complete decision problem for SGISO (at least not for all possible patterns) in polynomial time. Two alternative segment matching methods will now be described.

First Alternative Segment Matching Method

Segment Matching processes the edges in the pattern graph, one at a time, until every edge has been processed. As each edge is processed, a new Match Diagram is created, an existing Match Diagram is transformed, or two Match Diagrams are joined (by creating a link between them). If the pattern graph was well formed, then once all the edges in the pattern graph have been processed there will be a single Match Diagram remaining and that Match Diagram will represent exactly those tuples that match the search pattern.

The order in which edges are processed governs the order in which Segment Matching operations are performed. In some cases, the order can significantly affect the time and computational resources required to complete the Segment Matching process. Similar issues are observed in traditional DBMS where a "query optimizer" is used to select among many equivalent "query plans" to process an SQL query. It should be noted, however, that due to the Match Diagram's much greater efficiency at representing sets of tuples compared to the tables used by a traditional DBMS, Segment Matching is much less sensitive to the processing order than conventional methods. Still, more efficient processing is possible when the processing order is selected carefully by a Segment Matching planner already described above.

In this segment matching method, the Segment Matching process is described where the segments in the pattern graph are processed in an arbitrary order subject to only the following constraints:

1. The segment selected for the first step may be selected arbitrarily. The two pattern nodes connected to this segment are marked as being "visited" upon completion of this step.

2. Each subsequent step must select a segment that has not already been selected and that also is connected to at least one visited node.

The processing the segments in this order ensures that there is always one Match Diagram at the completion of each step. This restriction aids in discussion and illustration of the process, but is not required in an implementation of the process.

Each node in the pattern graph will be represented initially by a table in the Match Diagram. As segments are processed, the Match Diagram will (generally) be transformed so that a link joins the two tables corresponding to the pattern nodes connected by the segment. As processing takes place, the Match Diagram will be transformed. In some cases, new tables will be created, and links will be removed or replaced with other links. As a consequence, the tables and links in the final Match Diagram will not correspond directly to the nodes and segments in the pattern graph. However, through the appropriate use of closed transformations, the Segment Matching process ensures that once a segment has been processed, the constraints required by that segment will remain satisfied for the duration of the process. In that way, once every segment has been processed, the Match Diagram will contain exactly those tuples that simultaneously satisfy all of the constraints from the pattern.

As each segment is processed, there are one or more constraints associated with that segment that must be addressed. The constraints can be:

1. The attributes might be required to be joined by some relation. Recall that relations are encoded directly in GNF as pairings between attributes. This constraint therefore amounts to confirming that the tuples only contain attribute value pairs that are also listed in the GNF relation table.

2. The attributes might be required to satisfy some mathematical or logical comparison (e.g., x<y).

3. The attributes might be involved in the computation of a new attribute value (e.g., t=x+y).

All of the constraints present on the segment will be processed before proceeding to the next segment.

Second Alternative Segment Matching Method

Each segment in the pattern graph is initially converted into a link between two tables in a Match Diagram. Each link constructed must connect exactly those rows that satisfy the pair-wise constraints defined for the segment. Note that the Match Diagram created in this fashion may have cycles, in violation of one of the conditions for a properly constructed Match Diagram. The remaining steps in the process involve transforming the diagram to remove these cycles.

While there exists a cycle in the links of the Match Diagram, select a link, link A, that is part of a cycle. Then perform a sequence of closed transforms on the Match Diagram that replace this link with a new link, link A', that connects two tables which are already connected by some other link in the Match Diagram, link B. This sequence of transformations will remove at least one cycle from the Match Diagram, but will leave the diagram in a form where there are two links between the same pair of tables. These two links are then combined and replaced with a single link representing the intersection of edges in link A' and link B. These steps are repeated until there are no cycles present in the Match Diagram. Once all cycles have been removed, the Segment Matching process is complete and the Match Diagram represents exactly those tuples that match the search pattern.

Now, an exemplary implementation of the segment matching system and method is provided in which the input element data set and match diagram are represented using a typed graph although the segment matching system is not limited to using the typed graph. In this exemplary implementation of the segment matching system and method, the graph normal form (GNF) language is used (although the segment matching system is not limited to using the GNF language) for the diagrams and input data element set and the pattern query language (PQL) is used to describe the search pattern (although the segment matching system is not limited to using the PQL language.)

Typed Graph Schema

To provide efficient interaction with a software system efficient for both people and computers, a mechanism is needed that describes the form of the data. The system may use a mechanism that has the benefits of a graph representation as well as the benefits of a structured data representation found in other tools like a relational database. In one example, this can be achieved with a graph schema which is strongly typed that also has an associated compiler that controls the interaction and mapping of our graph constructs to database constructs known as Graph Normal Form (GNF).

The typed graph schema of the system does not support edge attributes, but rather supports relationship attributes where edges can be elements of a relationship as was described above.

Representational Complexities

Data Structure Complexity

To accommodate the special case of the binary relationships for edge attribute support, the system also needs to restrict the underlying representation for the graph data structures. For example, the system is not able to use an adjacency list representation because we have to store a unique identifier for each edge and would have a level of indirection in the data structures that make it inefficient for many operations.

Search Complexity

Complexities also show up in the implementation of search algorithms as well. To make search work seamlessly with a pattern representation and graph schema, two search methods are used with one method for nodes and one for edges as a special case of the node method. In general, this dual implementation is not desirable.

Match Complexity

If the system allows edge attributes then the system must also provide a semantic for binding an edge to a variable in a graph pattern or query. Creating such a definition turns out to be quite difficult, and again, we see a substantial increase in the complexity of representation and implementation of such a feature, while at the same time we cannot easily define a comprehensive visualization of such a feature.

Example Schema

To show how we can describe a graph schema, and example schema is given below that creates a set of strongly-typed elements and how they can relate to each other.

```
schema lotsOfTypes is
  class HasString is
    value name: String(100);
    relationship date_edges: set(HasDate);
    relationship time_edges: set(HasTime);
  end
  class HasDate is
    value name: Date;
    relationship time_edges: set(HasTime);
    relationship timestamp_edges: set(HasTimestamp);
  end
  class HasTime is
    value name: Time;
    relationship timestamp_edges: set(HasTimestamp);
    relationship integer_edges: set(HasInteger);
  end
  class HasTimestamp is
    value name: Timestamp;
    relationship integer_edges: set(HasInteger);
    relationship decimal_edges: set(HasDecimal);
  end
  class HasInteger is
    value name: Integer(19);
    relationship decimal_edges: set(HasDecimal);
  end
  class HasDecimal is
    value name: Decimal(99,10);
    relationship date_edges: set(HasDate);
  end
  class HasCurrency is
    value name: Currency(15,2);
    relationship date_edges: set(HasDate);
  end
  class HasAll is
    value string_value: String(99);
    value date_value: Date;
    value time_value: Time;
    value timestamp_value: Timestamp;
    value integer_value: Integer(9);
    value decimal_value: Decimal(98,10);
    value currency_value: Currency(14,2);
    relationship string_edges: set(HasString);
    relationship date_edges: set(HasDate);
    relationship time_edges: set(HasTime);
    relationship timestamp_edges: set(HasTimestamp);
    relationship integer_edges: set(HasInteger);
    relationship decimal_edges: set(HasDecimal);
    relationship currency_edges: set(HasCurrency);
  end
end
```

Graph Schema Parser and Lexer

An example of an implementation of a parser and lexer for the typed graph schema language is given in Appendix A using LL(2) grammar described using the ANTLR generator language. The parser and lexer for the typed graph schema language in not limited to the implementation with the particular language in Appendix A.

Graph Normal Form Schema Generator

Figures 22A, 22B, 22C:
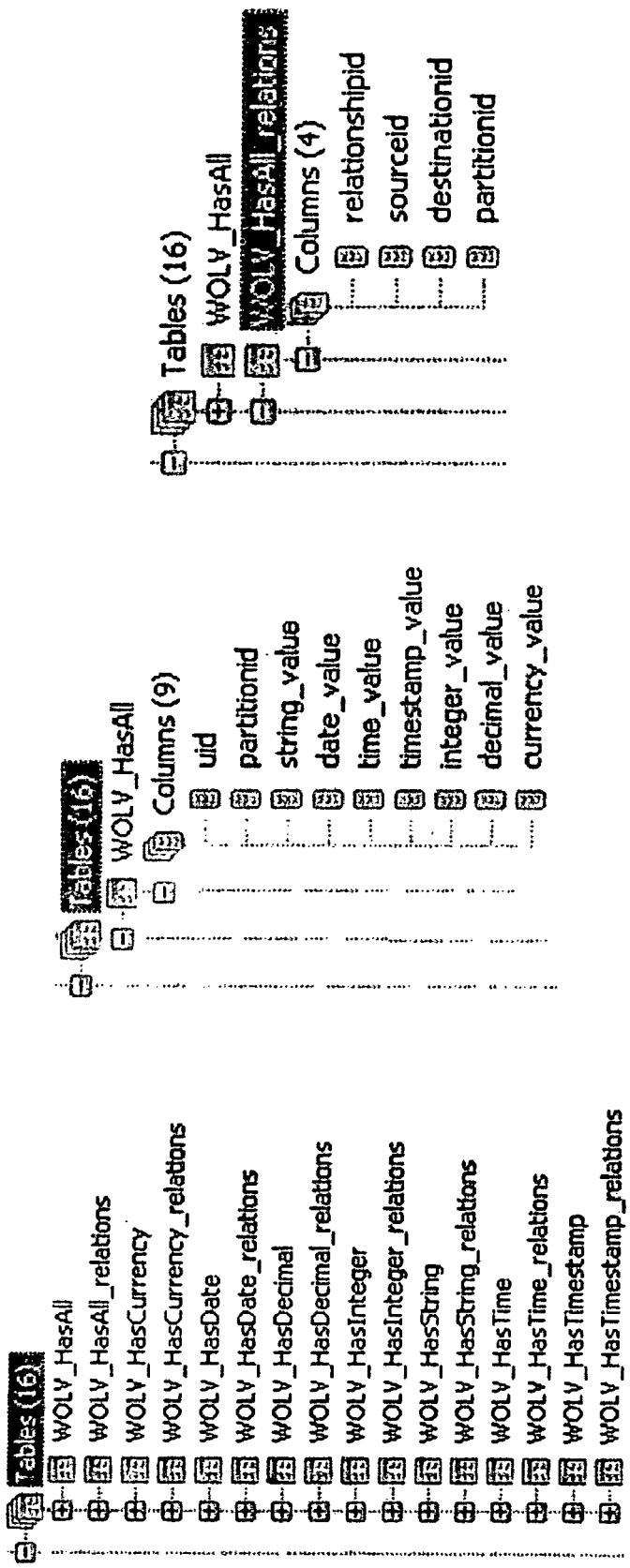
FIGS. 22A-C are examples of the relational database tables created using the exemplary source code in Appendix A.

To map the graph schema to database constructs, a combination of open-source technologies that allow the system to dynamically generate the database representation without having to worry about the specific database platform utilized to store graph information is used. Specifically, in one exemplary embodiment in Appendix A, a template language Velocity is used to iterate over the graph schema object model and produce a Hibernate mapping specification. Given the Hibernate mapping specification, the system can generate the platform Data Definition Language (DDL) for the database platform. The system uses this combination of technologies because each database vendor has a different way of representing the database schema. However, the system and method are not limited to the particular language. When the generated DDL is processed, the system generates a relational database schema that looks like the tables set forth in FIGS. 22A-C. FIG. 22A shows the database tables that capture the classes and relationships in the exemplary schema above. FIG. 22B shows the expansion of the HasAll class and FIG. 22C shows the expansion of the HasAll Relationships table.

Search Pattern Language

Search Pattern Language Parser and Lexer

An exemplary implementation of the search pattern parser and lexer is in Appendix A. However, the system and method is not limited to the particular language used in Appendix A The results of the compilation are provided to other parts of the system to process and execute. For example, the search pattern is input to the planner as described above.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A computer implemented method for transforming a match diagram, comprising:
   receiving a match diagram that has one or more vertexes representing one or more input nodes and one or more edges that represent a relationship between the input nodes wherein a set of paths through the match diagram represents a set of tuples; and
   performing a transformation operation on the match diagram to alter the vertexes and edges in the match diagram in order to generate a decision diagram, wherein the transformation operation affects the set of tuples represented by paths in the match diagram, and
   wherein performing the transformation operation further comprises performing one or more of adding a particular edge to the match diagram, constraining a particular edge of the match diagram, lifting a particular edge of the match diagram, promoting a particular edge of the match diagram, merging one or more input nodes of the match diagram, projecting the set of tuples in the match diagram and reducing the set of tuples in the match diagram.

2. The method of claim 1 further comprising altering the structure of the match diagram.

3. The method of claim 1 further comprising altering the structure of the match diagram and the tuples represented by the match diagram.

4. A computer implemented method for transforming a match diagram, comprising:
   receiving a match diagram that has one or more vertexes representing one or more input nodes and one or more edges that represent a relationship between the input nodes wherein a set of paths through the match diagram represents a set of tuples;
   performing a transformation operation on the match diagram to alter the vertexes and edges in the match diagram in order to generate a decision diagram, wherein the transformation operation affects the set of tuples represented by paths in the match diagram; and
   enumerating the tuples represented by the decision diagram.

* * * * *